(12) United States Patent
McCloskey et al.

(10) Patent No.: US 11,288,537 B2
(45) Date of Patent: Mar. 29, 2022

(54) IMAGE FORENSICS USING NON-STANDARD PIXELS

(71) Applicant: Honeywell International Inc., Morris Plains, NJ (US)

(72) Inventors: Scott McCloskey, Minneapolis, MN (US); Keigo Hirakawa, Dayton, OH (US)

(73) Assignee: Honeywell International Inc., Charlotte, NC (US)

( * ) Notice: Subject to any disclaimer, the term of this patent is extended or adjusted under 35 U.S.C. 154(b) by 56 days.

(21) Appl. No.: 16/785,337

(22) Filed: Feb. 7, 2020

(65) Prior Publication Data
US 2020/0257929 A1 Aug. 13, 2020

Related U.S. Application Data

(60) Provisional application No. 62/803,151, filed on Feb. 8, 2019.

(51) Int. Cl.
*G06K 9/62* (2006.01)
*G06K 9/46* (2006.01)
(Continued)

(52) U.S. Cl.
CPC ....... *G06K 9/6212* (2013.01); *G06K 9/00577* (2013.01); *G06K 9/4642* (2013.01);
(Continued)

(58) Field of Classification Search
CPC .. G06K 9/6212; G06K 9/4642; G06K 9/6256; G06K 9/6202; G06K 9/00577;
(Continued)

(56) References Cited

U.S. PATENT DOCUMENTS 5,499,294 A   3/1996  Friedman
7,129,973 B2  10/2006 Raynor
(Continued)

OTHER PUBLICATIONS

P. Zhang and X. Kong, "Detecting Image Tampering Using Feature Fusion," 2009 International Conference on Availability, Reliability and Security, 2009, pp. 335-340, doi: 10.1109/ARES.2009.150. (Year: 2009).*

(Continued)

*Primary Examiner* — Nay A Maung
*Assistant Examiner* — Daniella M. DiGuglielmo
(74) *Attorney, Agent, or Firm* — Schwegman Lundberg & Woessner, P.A.

(57) ABSTRACT

A system and process to determine whether a digital image has been manipulated involves determining expected locations of non-standard pixels in the digital image, and determining a feature for evaluating the non-standard pixels. The feature in pixels of the digital image that are located at the expected locations of non-standard pixels is then measured, and a statistical measure of the feature of pixels in the digital image that are located at the expected locations of non-standard pixels is evaluated. The digital image is assessed to determine a probability that the digital image includes a manipulated portion, based on the statistical measure. The system and process can also determine a make and model of an image sensing device via an examination of the non-standard pixels.

20 Claims, 14 Drawing Sheets

US 11,288,537 B2

Page 2

(51) Int. Cl.
*G06N 3/08* (2006.01)
*G06K 9/00* (2006.01)

(52) U.S. Cl.
CPC ......... *G06K 9/6202* (2013.01); *G06K 9/6256* (2013.01); *G06K 9/6277* (2013.01); *G06N 3/08* (2013.01); *G06K 2009/00583* (2013.01)

(58) Field of Classification Search
CPC ....... G06K 9/6277; G06K 2009/00583; G06N 3/08
USPC ...................................................... 382/165
See application file for complete search history.

(56) References Cited

U.S. PATENT DOCUMENTS

| 7,505,606 | B2 | 3/2009 | Lin et al. |
| 7,539,331 | B2 | 5/2009 | Wendt et al. |
| 7,603,559 | B2 | 10/2009 | Roberts et al. |
| 8,027,468 | B2 | 9/2011 | McCloskey |
| 9,934,434 | B2 | 4/2018 | McCloskey |
| 10,586,152 | B2 | 3/2020 | Chen et al. |
| 2003/0123700 | A1 | 7/2003 | Wakao |
| 2006/0262973 | A1 | 11/2006 | Lin et al. |
| 2008/0013836 | A1 | 1/2008 | Nakamura et al. |
| 2008/0036863 | A1 | 2/2008 | Esbensen |
| 2008/0276095 | A1 | 11/2008 | Iwamura |
| 2009/0290752 | A1 | 11/2009 | Kalva |
| 2010/0265320 | A1 | 10/2010 | Treado et al. |
| 2012/0087589 | A1* | 4/2012 | Chang-Tsun ............ G06K 9/40 382/190 |
| 2012/0016371 | A1 | 6/2012 | Skaff et al. |
| 2013/0308858 | A1 | 11/2013 | Xu et al. |
| 2014/0037198 | A1 | 2/2014 | Larlus-Larrondo et al. |
| 2014/0211989 | A1 | 7/2014 | Ding et al. |
| 2014/0376812 | A1 | 12/2014 | Kawazu |
| 2015/0213324 | A1* | 7/2015 | Farid .................. G06K 9/00577 382/218 |
| 2018/0005032 | A1 | 1/2018 | Mccloskey |
| 2018/0034852 | A1* | 2/2018 | Goldenberg ........ H04L 63/1483 |
| 2018/0232605 | A1 | 8/2018 | Chen et al. |
| 2020/0005078 | A1 | 1/2020 | Tambo et al. |

OTHER PUBLICATIONS

Y. Hsu and S. Chang, "Statistical fusion of multiple cues for image tampering detection," 2008 42nd Asilomar Conference on Signals, Systems and Computers, 2008, pp. 1386-1390, doi: 10.1109/ACSSC. 2008.5074646. (Year: 2008).*
K. Uomori, A. Morimura and H. Ishii, "Electronic Image Stabilization System for Video Cameras and VCRs," in SMPTE Journal, vol. 101, No. 2, pp. 66-75, Feb. 1992, doi: 10.5594/J02339. (Year: 1992).*
"U.S. Appl. No. 12/099,591, Non Final Office Action dated Feb. 4, 2011", 6 pgs.
"U.S. Appl. No. 12/099,591, Notice of Allowance dated May 19, 2011", 5 pgs.
"U.S. Appl. No. 12/099,591, Preliminary Amendment filed May 7, 2008", 6 pgs.
"U.S. Appl. No. 12/099,591, Response filed May 4, 2011 to Non Final Office Action dated Feb. 4, 2011", 7 pgs.
"U.S. Appl. No. 15/198, Preliminary Amendment filed Aug. 2, 2017", 3 pgs.
"U.S. Appl. No. 15/198,810, Notice of Allowability dated Dec. 19, 2017", 2 pgs.
"U.S. Appl. No. 15/198,810, Notice of Allowance dated Nov. 29, 2017", 9 pgs.
"U.S. Appl. No. 15/435,066, Examiner Interview Summary dated Sep. 3, 2019", 3 pgs.
"U.S. Appl. No. 15/435,066, Final Office Action dated May 31, 2019", 27 pgs.
"U.S. Appl. No. 15/435,066, Non Final Office Action dated Nov. 2, 2018", 28 pgs.
"U.S. Appl. No. 15/435,066, Notice of Allowance dated Nov. 1, 2019", 12 pgs.
"U.S. Appl. No. 15/435,066, Response filed Jan. 23, 2019 to Non Final Office Action dated Nov. 2, 2018", 15 pgs.
"U.S. Appl. No. 15/435,066, Response filed Aug. 29, 2019 to Final Office Action dated May 31, 2019", 12 pgs.
"European Application Serial No. 17177486.2, Extended European Search Report dated Oct. 24, 2017", 10 pgs.
"European Application Serial No. 17177486.2, Office Action dated Apr. 18, 2019", 5 pgs.
"European Application Serial No. 17177486.2, Response Apr. 2, 2018 to Extended European Search Report dated Oct. 24, 2017", 4 pgs.
"European Application Serial No. 17177486.2, Response Jul. 25, 2019 Office Action dated Apr. 18, 2019", 17 pgs.
Farid, Hany, "Image Forgery Detection—A Survey", IEEE Signal Processing Magazine, (Mar. 2009), 16-25.
Goljan, Miroslav, et al., "Large Scale Test of Sensor Fingerprint Camera Identification", Proc. SPIE 7254, Media Forensics and Security, 725401, IS&T/SPIE Electronic Imaging, 2009, San Jose, California, (2009), 13 pgs.
Hsu, Yu-Feng, et al., "Camera Response Functions for Image Forensics: An Automatic Algorithm for Splicing Detection", IEEE Transactions on Information Forensics and Security, 5(4), (Dec. 2010), 816-825.
Hsu, Yu-Feng, et al., "Detecting Image Splicing Using Geometry Invariants and Camera Characteristics Consistency", 2006 IEEE International Conference on Multimedia and Expo, (Jul. 2006), 549-552.
Hsu, Yu-Feng, et al., "Image Splicing Detection Using Camera Response Function Consistency and Automatic Segmentation", ICME, (Jul. 1, 2007), 28-31.
Hsu, Yu-Feng, et al., "Statistical Fusion of Multiple Cues for Image Tampering Detection", 2008 42nd Asilomar Conference on Signals, Systems and Computers, (Oct. 2008), 5 pgs.
Kee, Eric, et al., "Digital Image Authentication From JPEG Headers", IEEE Transactions on Information Forensics and Security, 6(3), (Sep. 2011), 1066-1075.
Lin, Zhouchen, et al., "Detecting Doctored Images Using Camera Response Normality and Consistency", 2005 IEEE Computer Society Conference on Computer Vision and Pattern Recognition (CVPR'05), San Diego, CA], IEEE, Piscataway, NJ, USA, vol. 1, (Jun. 20, 2005), 1087-1092.
Rocha, Anderson, et al., "Vision of the Unseen: Current Trends and Challenges in Digital Image and Video Forensics", ACM Computing Surveys, 3(4), Article No. 26, (Oct. 2011), 1-42.
Zhang, Pin, et al., "Detecting Image Tampering Using Feature Fusion", IEEE 2009 International Conference on Availability, Reliability and Security, Mar. 16-19, 2009, (2009), 335-340.
"U.S. Appl. No. 16/400,542, Notice of Allowance dated Jul. 30, 2020", 16 pgs.

* cited by examiner

IMAGE FORENSICS USING NON-STANDARD PIXELS

RELATED APPLICATIONS

The present application claims priority to U.S. Application Ser. No. 62/803,151, the content of which is incorporated herein by reference in its entirety.

GOVERNMENT INTEREST

This invention was made with Government support under Contract FA8750-16-C-0190 awarded by the Air Force. The Government has certain rights in this invention.

TECHNICAL FIELD

The present disclosure relates to the identification of forged images and the identification of a device model that generated a digital image, and in an embodiment, but not by way of limitation, the identification of forged or manipulated images and the identification of a device model that generated a digital image using expected locations and features of non-standard pixels.

BACKGROUND

Image and video forensics are increasingly relevant in society today, due to the emergence of technologies which simplify the manipulation or synthesis of digital imagery. As a result, there is a technical need to authenticate imagery, that is, to distinguish genuine photographs from those that have been edited or manipulated (for example, by using Photoshop or other applications). Commercially, this is important to both governmental and commercial interests. For example, commercial interests such as insurance companies use smartphone-captured imagery in a business process such as in the processing of claims. A related need is to uniquely associate a given image or video with the specific camera make or model that was used to capture it. This camera identification problem is largely of interest to law enforcement agencies.

Many methods have been developed for both manipulation detection and camera identification, each of which has associated drawbacks. In manipulation detection, a key limitation is that a lack of distinguishable features in the imagery can make it prohibitively difficult to assess its authenticity. As such, information about the hardware used to capture the imagery can be decisive in accurately detecting manipulations. In camera identification, a key limitation is the inability to robustly identify the source camera for a video captured using Electronic Image Stabilization (EIS), which makes it impossible to establish a unique mapping of pixels in a frame of video to a physical sensor photo site that recorded it.

BRIEF SUMMARY OF THE INVENTION

An embodiment determines whether a digital image has been manipulated. This is accomplished by determining expected locations of non-standard pixels in the digital image, and determining a feature for evaluating the non-standard pixels. The feature in the pixels of the digital image that are located at the expected locations of non-standard pixels is then measured, and a statistical measure of the feature of the pixels in the digital image that are located at the expected locations of non-standard pixels is evaluated. The digital image is assessed to determine a probability that the digital image includes a manipulated portion, based on the statistical measure. The embodiment can also determine a make and model of an image sensing device via an examination of the non-standard pixels.

DETAILED DESCRIPTION

Figure 1:
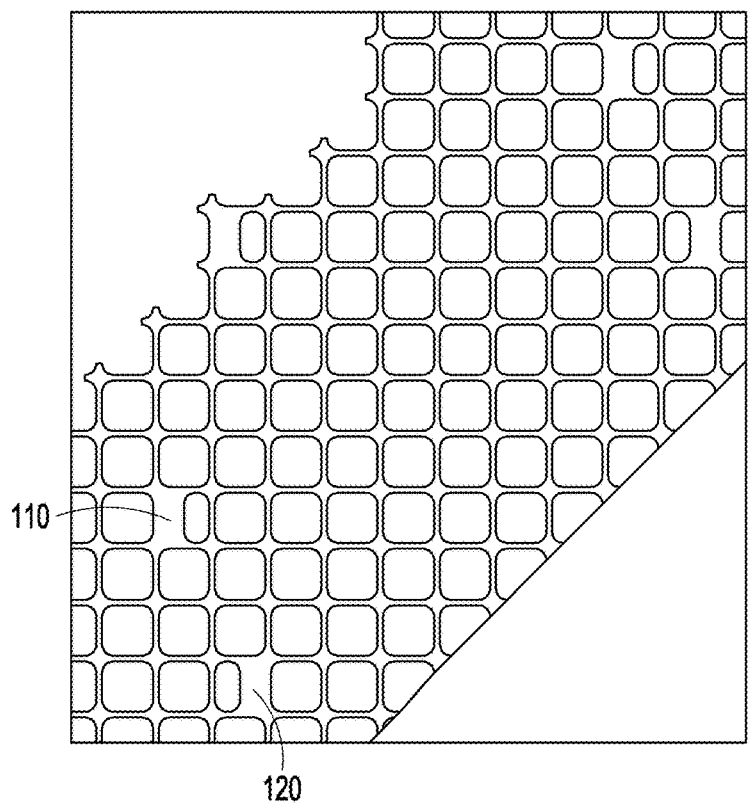
FIG. 1 illustrates a masking of non-standard pixels in a digital image.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

One or more embodiments disclosed herein address the disadvantages discussed above with prior image manipulation detection and image sensor identification, that is, a lack of distinguishable features in the imagery and the inability to robustly identify the source camera for a video captured using Electronic image Stabilization (EIS). These embodiments address these disadvantages by leveraging camera sensor hardware to enable robust manipulation detection and to estimate the per-frame impact of EIS in order to back it out and enable camera identification for stabilized video.

A certain type of pixel, which can be referred to as a non-standard pixel in general, and more specifically, as a focus or dual pixel, is resident on certain types of image sensing devices, such as an Apple iPhone 7. These non-standard focus pixels can be detected and localized from a stack of raw images. Additionally, these pixels may be detected by data similar to the data used for Photo Response Non-Uniformity (PRNU) fingerprinting, but they are device independent. On the iPhone 7 for example, these non-standard focus pixels are a subset of greens in the Bayer pattern. With at least some image sensing devices, non-standard focus pixels produce image pixels with a lower standard deviation. A reason for this lower standard deviation may be the result of the image sensing device interpolating over the non-standard focus pixels. As disclosed herein, these non-standard focus pixels can be used in forensic applications, such as determining if a digital image has been altered or determining the type of image sensing device that generated the digital image.

One or more embodiments are unique compared to the state of the art in forensics in that these embodiments leverage cues from modern smartphone camera hardware, specifically non-standard, focusing, or dual pixels, which were first introduced in 2014 by Apple. These pixels are physically different than normal pixels on the sensor, leading to slight feature and statistical differences that can be used to detect or verify their presence in digital imagery. These non-standard pixels, and the locations of them that are estimated from imagery, are unique relative to the state of the art in that they are deliberately placed in a uniform distribution across the sensor and they are the same from one device to the next. Unlike the Photo Response Non-Uniformity (PRNU) approach to forensics, the use of a uniform distribution across all instances of a phone model (for example, all iPhone 6 cameras) eliminates the need for a large collection of example imagery from which to estimate a PRNU fingerprint. Additionally, the known location of these pixels on the sensor leads to the technical benefit of estimating the shifting of video frames arising from EIS, enabling the use of sensor fingerprinting for stabilized video.

An advantage of using these non-standard pixels in image forensics and image sensor identification is that this use enables a new suite of forensics. In one example, law enforcement agencies are currently unable to use sensor fingerprinting for video because of EIS. In the commercial sector, insurance companies are increasingly accepting smartphone-captured imagery in claims of loss, for which they need forensics to detect fraud. These embodiments enable sensor fingerprinting in the presence of EIS, which is a long-standing problem in video forensics.

While embodiments leverage physical differences in the sensor hardware of smartphone cameras and other image sensing devices, one or more embodiments are implemented in software. Given an image (or a frame from a video), embodiments assess local image statistics around the expected locations of the non-standard pixels in order to verify that they are intact (that is, the image has not been manipulated). The expected locations of the non-standard pixels may change somewhat from one generation of a camera to the next, so metadata embedded in the imagery (for example, EXIF tags in a PEG image) can be used to pre-load a map of expected focus pixel locations. In the absence of such metadata, the image can be compared exhaustively to all known maps of non-standard pixels in order to assess the make and model of the source camera.

Assessing the local image statistics near expected non-standard pixel locations enables several forensics. In a first embodiment, the veracity of the metadata related to the source camera can be assessed. That is, for example, if the EXIF tags indicate that the source camera was an iPhone 7, the authenticity of the image can be assessed based on how well the image statistics agree with the known iPhone 7 non-standard (that is, focus) pixel locations. This process can be applied globally across the entire image. In a second embodiment, the presence of spliced-in content can be detected by finding regions within the image where the local image statistics are inconsistent with the local pattern of non-standard pixels. This can detect, for example, someone having spliced in a person from a separate image, copy-move manipulations within an image, or deletion of image regions. In a third embodiment, and in particular in the case of a video, the lack of non-standard pixel markers in the expected locations indicates that EIS has shifted the image for the purpose of stabilization. After detecting such a shift, the image statistics can be compared to those expected from different EIS-induced shifts, in order to estimate the per-frame translation from EIS. This enables a sensor fingerprinting algorithm to re-establish the association between a pixel intensity in the video and the unique photo site at which it was captured.

Formerly, when a person took a picture or a video with a cell phone or other image sensing device, the cell phone image would stagnate and try to focus on whatever was in the middle of the field of view, and it would do so by moving the motor in the cell phone until it got something sharp in the field of view. A solution to this problem was the introduction of non-standard or focus pixels. These non-standard pixels masked one side or the other of the pixel. This is illustrated in FIG. 1. As shown in FIG. 1, the one pixel is masking the left half 110, and another pixel is masking the right half 120. While FIG. 1 shows a masking of the left and right half of the pixel, it need not be masking per se, but just a difference in how the left half and the right half of the pixel are interpreted, that is, separately measuring the light coining through different parts of the pixel or aperture. These non-standard pixels can also have a micro lens structure over top of it. The micro lens structure permits the pixel or sensor to see the light that is coining through one side of the lens; optionally, in dual pixel setups, the corresponding pixel will see light that is coming through the other side of the lens. This is similar to how a single lens reflex camera accomplishes focusing. Then, the non-standard or focus pixels can measure the separation between the object that is being focused on in the left and the right half. Consequently, the camera can figure out immediately where it needs to focus instead of sweeping through the field of view.

In some image sensing devices, the exact arrangement of such non-standard pixels can change over subsequent generations of devices. This change of arrangement could be used as a forensic cue. Also, other sensor manufacturers and other phone/device manufacturers have different arrangements, which is also a forensic queue. In some devices, the non-standard pixels are at every pixel, instead of just a few sprinkled throughout the grid. These differences among different devices lead to some differences in how forensics are accomplished.

Regarding forensics, the fact is that these non-standard pixels are physically different than regular sensor pixels, and therefore these non-standard pixels can be detectable. And it can be helpful vis-à-vis forensics that these non-standard pixels are few in number and they appear in a particular pattern in a particular device model. For devices that include these non-standard pixels for every pixel, such devices are still useful for forensics, but in different ways.

Figure 2:
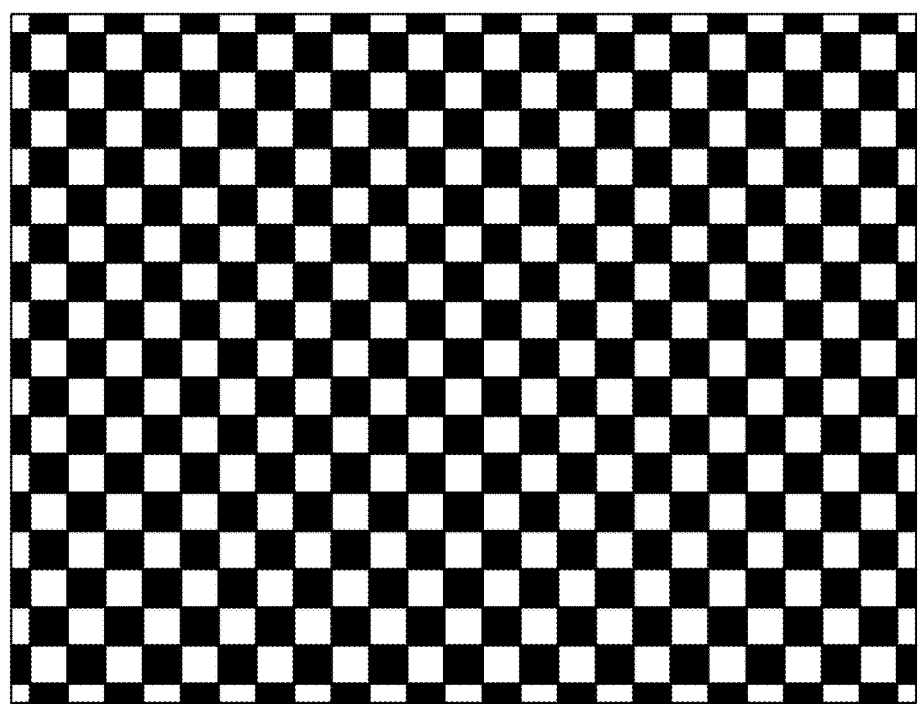
FIG. 2 illustrates a raw image or output of a Raw Plus app on an Apple iPhone 7.

If the existence and/or location of non-standard pixels on a device is not known, there is an engineering process to go through to be able to detect such non-standard pixels on a device. For example, to determine the location of these non-standard pixels, some raw images are first captured. In an iPhone, there is an app called Raw Plus that provides a raw image, that is, an image that hasn't gone through all the processing of the device. The "raw" term simply suggests that the data are just directly what the sensor measured. And for a non-standard pixel in a raw image, since half of the non-standard pixel is shielded, one would expect the non-standard pixel to be half as bright, because fewer photons make it through in the presence of the masking. The raw image or the output of the Raw Plus app on an iPhone 7 produces an output as illustrated in FIG. 2. This pattern has to do with the color filter array. But the output does not actually show that the non-standard pixels are half as bright. Consequently, the camera firmware is covering up this signal loss. To cover up this signal loss, one could interpolate over the non-standard pixels by averaging the neighboring values, or amplifying only half as much light that made it through the pixel. And one could multiply the value by two in order to make up for the light loss. In general, a device will implement some type of processing to hide the non-standard pixels or to make the image look normal, that is, that there is not a regular arrangement of non-standard or very dim pixels.

Figure 3A:
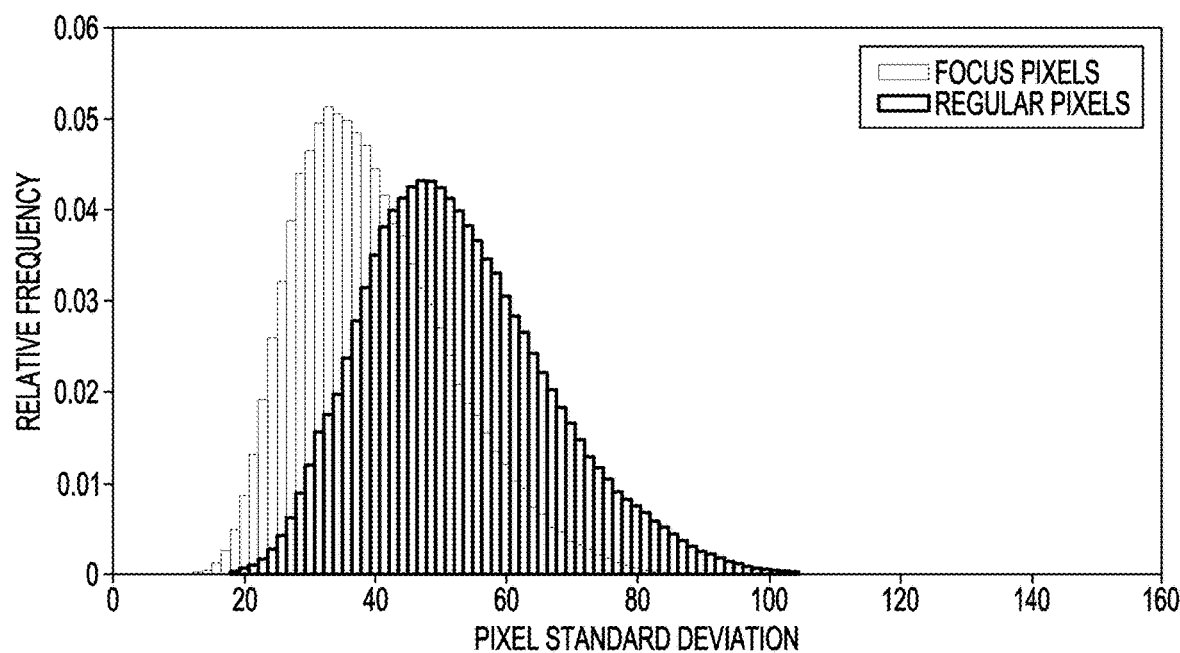
FIGS. 3A and 3B illustrate that non-standard pixels in a digital image are characterized by a lower standard deviation than standard pixels.
Figure 3B:
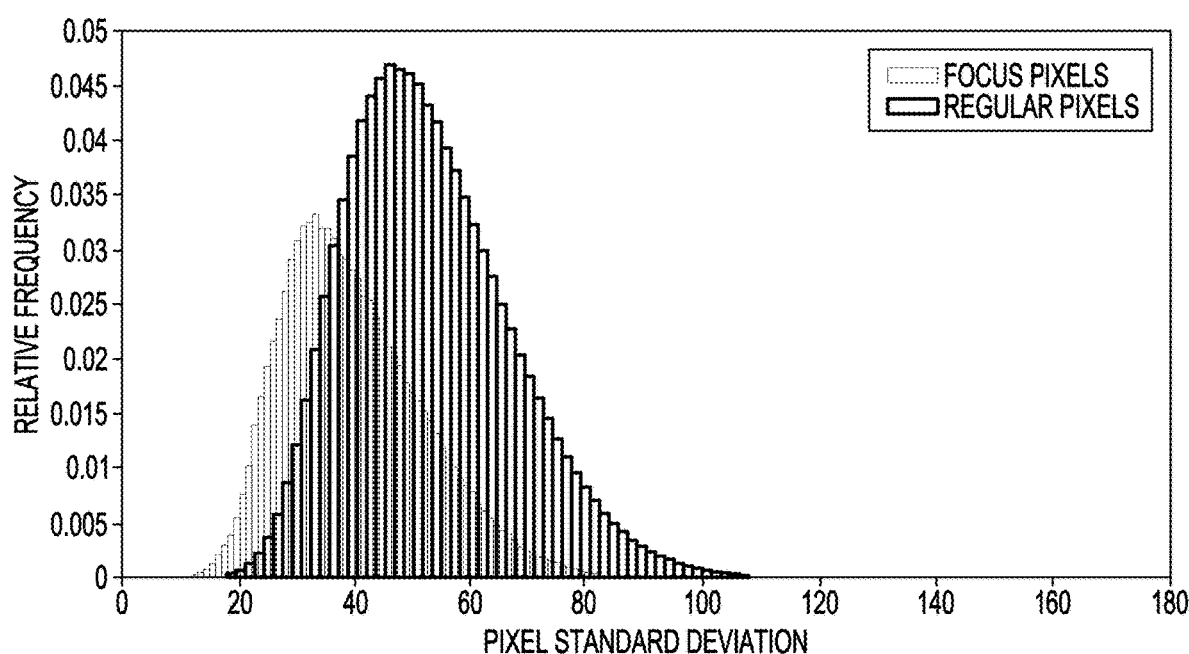

In some devices, the standard deviation of intensity of the non-standard pixels is lower than standard pixels. This can be shown by capturing a dozen or so images of an unfocused white wall in order to measure the sensitivity of each pixel. In an unfocused picture of a white wall, all the pixels are receiving the same amount of light. At each pixel stack of images, a standard deviation of intensity is computed. This characterization to figure out the arrangement of the non-standard pixels by capturing a stack of raw images and doing some statistical analysis to show that the non-standard pixels are characterized by a lower standard deviation than standard pixels is illustrated in FIGS. 3A and 3B.

Once the locations of the non-standard pixels are known, then through various forensic analyses one can look for these statistical markers of the non-standard pixels consistent with that arrangement with a particular camera model. Then, based on those statistical indicators, one can make some sort of forensic assessment of whether this image in fact came from the camera that it's claiming to have come from, or whether regions of the image have been manipulated.

In an embodiment, the standard deviation is used to detect focus pixels. The standard deviation is computed across each pixel on a sensor. This can be done for two different cameras. A cross correlation is then computed of the two fields of standard deviations to determine when the two signals are very well aligned. Within a raw image, most sensors have a 2×2 pattern where standard, brighter two pixels measure green lights, and then the other two are in some order red and blue. If one takes a cross correlation of this pattern with another that looks like it, one gets very high peaks at every other spacing just because the white and dark pixels would align that way. So each of the raw images can be separated into the different color channels. Each color channel is made up with a certain starting pixel, and then every other pixel is taken in both the horizontal and vertical directions.

The cross correlation provides the separation between two color channels. The separation between these peaks, the bright parts of the cross-correlation output inform one of the spacing between the non-standard pixels. This doesn't inform one of exactly where the non-standard pixels are, but the cross-correlation informs one that the non-standard pixels are separated by four, for example (four pixels horizontally and four pixels vertically). So while one now knows the spacing between the non-standard pixels, one does not absolutely know where the non-standard pixels are located. To determine where the starting position of the non-standard pixels are, one goes through the image and masks different pixels in a 4×4 region until the signal cross correlation with all peaks goes away. In the cross correlation, one knows that somewhere in the repeating 4×4 pattern one of the pixels is the source of the recurring spikey output. At this point, a guess is first made, and the pixel is masked out and the cross correlation is computed. If the peaks are still there, that means that this particular pixel is not the non-standard pixel. This process is repeated until the selected, masked out pixel generates a non-peaked or a flat cross correlation. The flat correlation then informs one that it was this particular pixel in this repeating 4×4 pattern that gave rise to the flat cross correlation, which means that this pixel must be the non-standard pixel. This is just one particular example. However, in general, there is a calibration process to first determine where the non-standard pixels are located. Also, in general, there is a characterization phase where one determines what the statistical indicators are for that particular make and model of camera.

Figure 4:
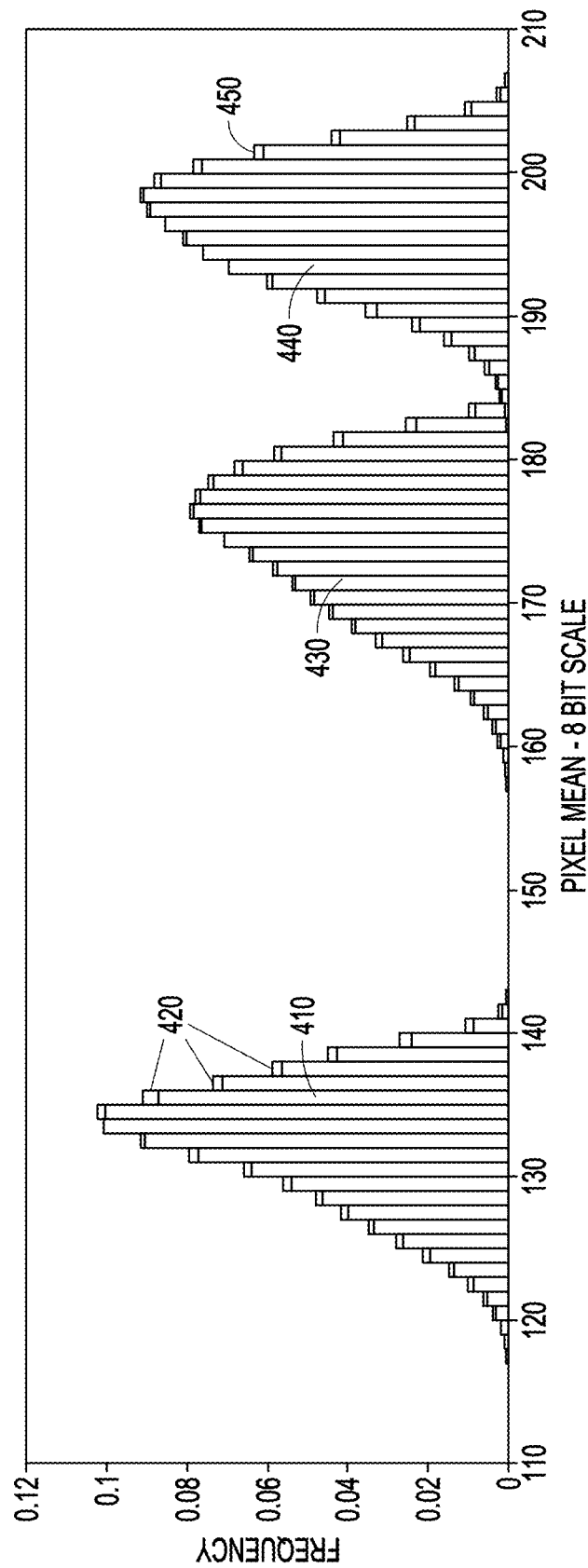
FIG. 4 illustrates a histogram of a PEG image of a blurry white wall.

As discussed above, raw images of blank walls generate a lower standard deviation from non-standard pixels than from standard pixels. In practice however, raw images are not a common way of sharing images. It is more common for people to share JPEG images. So while with raw images the non-standard pixels are characterized by a lower standard deviation, this is not necessarily the case with JPEG images, and/or the difference is not as significant. So the indicator in a JPEG image may not be the standard deviation. Rather, it may be the intensity or brightness that is recorded at each non-standard pixel. FIG. 4 illustrates a histogram of a JPEG image of a blurry white wall. In FIG. 4, the blue non-standard pixels are the histogram 410. And the blue channel from the standard pixels are shown as a histogram 420 which is mostly just behind histogram 410 except for how it peeks out on the right hand side. The left hand side of the histogram 410 peeks out over the histogram 420 a little bit (such that the histogram 420 is not visible on the left hand side). The same sort of result happens in the green channel. The green non-standard pixels stick up on the right hand side of the distribution at 430. And then finally the same result is present on the red channel. The non-standard pixels stick out at 440, and the standard pixels stick up on the right at 450. This informs where in the each of the red, green, and blue channels the non-standard pixels are in a JPEG image, as indicated by a slightly lower intensity. In an example, this is characterized as being around $1/10^{th}$ of one percent of an intensity difference. In summary, in the raw images, the standard deviation sticks out as the difference but in PEG images, it's a much smaller intensity difference.

Images have metadata. In a JPEG image, these data are referred to as EXIF. These data inform what model of camera captured the image. In the forensics case, one can use the metadata to determine the make and model of the device, then look up in a database a map of the non-standard pixels for the device and the statistical indicators for these non-standard pixels for this device. And then one can interrogate the image to see if it is consistent with the location and statistical indicators for the non-standard pixels for this device.

In a single JPEG image rather than a stack of raw images, a factor is texture in the image. If the image includes for example a nice flat, gray sky, it's relatively easy to observe these $1/10$ of a percent of intensity differences than when there is a region where there are already significant intensity differences due to the presence of texture like the trees in contrast to the nice flat, gray sky.

For genuine non-standard pixels that have not been altered in an image, one would expect that the intensity is $1/10^{th}$ of one percent lower than it would be if a standard pixel was in that location. In a 12 mega pixel image, these little patterns of non-standard pixels are basically a repeating pattern in an 8×8 block. Within an 8×8 block, there are two non-standard pixels that are always at the same relative location. This pattern is repeated over and over across a grid of about 4,000 by 3,000 pixels.

In a forensics application, once one knows what sort of image it is claiming to be, and there is a look up of where the non-standard pixels are, and what the statistical indicator should be, one goes through at each of those non-standard pixel locations across the image and validates the presence of the non-standard pixel by the statistical indicators that are associated with that camera make and model. And then the validity of the non-standard pixels at those different locations informs one about the integrity of the image at that location.

Figure 5:
FIG. 5 is a map illustrating where e non-standard pixels are expected to be in a digital image.

Referring to FIG. 5, a map is illustrated of where the non-standard pixels are expected to be. Then, the differences both in standard deviation and the mean intensities are computed over the red, green, and blue color channels as follows:

$$std(FP_R)-std(NFP_R)+std(FP_G)-std(NFP_G)+std(FP_B)-std(NFP_B)+mean(FP_R)-mean(NFP_R)+mean(FP_G)-mean(NFP_G)+mean(FP_B)-mean(NFP_B)$$

Wherein FP refers to a focus or non-standard pixel and NFP refers to a non-focus or standard pixel. Referring again to FIG. 5, if it's darker and if it's smaller, it should be slightly negative if it's really a non-standard pixel. And if not, it should be around zero (per the above equation). If one computes that within each 8×8 block on the grey part of the sky of the image mentioned above, one gets a reasonably good separation. So the bright parts in the image in FIG. 5 are the parts that are close to zero because those were spliced in from some other device. And so those stick out as brighter compared to the background parts which are non-spliced-in parts of the image.

A bilateral filter approach is a way to estimate what the intensity of pixels should be, even if there are some edges and texture nearby. Using the following equation:

$$I^{filtered}(x) = \frac{1}{W_p}\sum_{x_i\in\Omega}I(x_i)f_r(\|I(x_i)-I(x)\|)g_s(\|x_i-x\|)$$

a sum is computed over a neighborhood omega ($\Omega$). It is the weighted sum of a plurality of intensities, that is I, the image evaluated at the pixel $x_i$, and again each $x_i$ is just a bunch of pixels in a certain neighborhood, pixels within for example a radius of five pixels from the one pixel at which the filtered version is computed. There are two terms in the bilateral filter, $f_r$ and $g_s$, where $g_s$ is a standard Gaussian filter term where there is this weight that falls off as one gets further and further away. The term x refers to the center pixel at which one is computing this value. The term $x_i$ is again the factor that is changing over the neighborhood and this magnitude of $x_i$ minus x is just how far away one is from the pixel in question. And then the g is very high when this value is zero and as it gets bigger the value of this function gets smaller. So things that are very close to a particular pixel, very high, and that weight falls off as one get further away. The bilateral part is the addition of the second term to the above equation. The second term has a weight that depends not only on how far away one is in space from the pixel in question, but how far away the intensities are. So, for example, when trying to figure out what the intensity of one of the grey sky pixels should be, but that pixel is surrounded by some dark pixels from a tree branch, then the difference between the intensity of the tree branch and the intensity of the sky pixel is relatively high. The term therefore is assigned a low weight. One does not want to average over the tree pixels when trying to compute the value of what the sky pixels should be. And then there is a normalizing which makes sure that there is no skewing one way or the other. The normalizing is a sum of the $f_r$ and $g_s$ terms over the whole neighborhood. The certain number of multipliers in the sum and it is desired to have the same sort of power in the denominator so that the filtered image does not get either brighter or darker. There is a neighborhood of pixels. There is an examination at a pixel X, an examination of other pixels in its neighborhood, and in particular the distance between the pixels and the intensity of the pixels.

A bilateral filter can be used to remove noise from an image. So one would like to predict what the true intensity of a pixel should be in the case of the bilateral filter in the presence of noise. It is known as an edge preserving denoising filter. In an embodiment, the filter is adapted to determine what the intensity of a pixel should have been if it was not a non-standard pixel. Once again, in an embodiment, a non-standard pixel is indicated by a slight reduction in intensity. So one wants to know from the neighbors of what is suspected of being a non-standard pixel what should this intensity be. And then there is the intensity that informs that it is a non-standard pixel, and then determine if there is a $1/10^{th}$ of one percent reduction.

In a forensic use case, an image includes data regarding the particular make and model of a particular device that captured the image. It can then be determined from a database look up that for this particular make and model, the non-standard pixels should be at certain locations, and these non-standard pixels should be characterized by a $1/10^{th}$ of one percent intensity reduction. Then, one tries to validate that those expected locations of non-standard pixels actually do have a $1/10^{th}$ of one percent intensity reduction relative to what they would have been were they not non-standard pixels. The value of what the non-standard pixel would have been had they not been a non-standard pixel is a filtered output of the bilateral filter.

Further regarding the bilateral filter, a ratio can be taken between the filtered value and the actual value. If the ratio is about 0.999, it can be hypothesized that is a non-standard pixel. Typically the way it is done with a non-standard pixel is that the neighborhood always contains a pixel at location x. But that would dilute the signal that is being looked for. So the $x_i$ term cannot be X by construction of the omega neighborhood. Because when x is in the neighborhood, and because the distance is zero, it always gets a high weight. And because the intensity difference is also zero it always gets a high weight. And that would water down the difference that is being looked for. This is a distinction between what is done with bilateral filters for de-noising and what is being done with this adaptation of the bilateral filter to predict the intensity that a standard pixel at that location would have had.

Having computed this, and being given the image itself, one can go through at each presumed non-standard pixel, compute the ratio between the actual intensity over the filtered intensity, and a value near 0.999 would indicate that the presumed non-standard pixel is indeed a non-standard pixel. A value near one would indicate that it is a standard pixel. While these are fine, distinctions, there are tens of thousands of non-standard pixels over a full image of about 10 meg or more of total pixels. So this ratio can be calculated at each of the expected non-standard pixel locations, and then various analyses can be performed and averaged over different regions to take this very noisy indicator and make it more reliable.

Figure 6A:
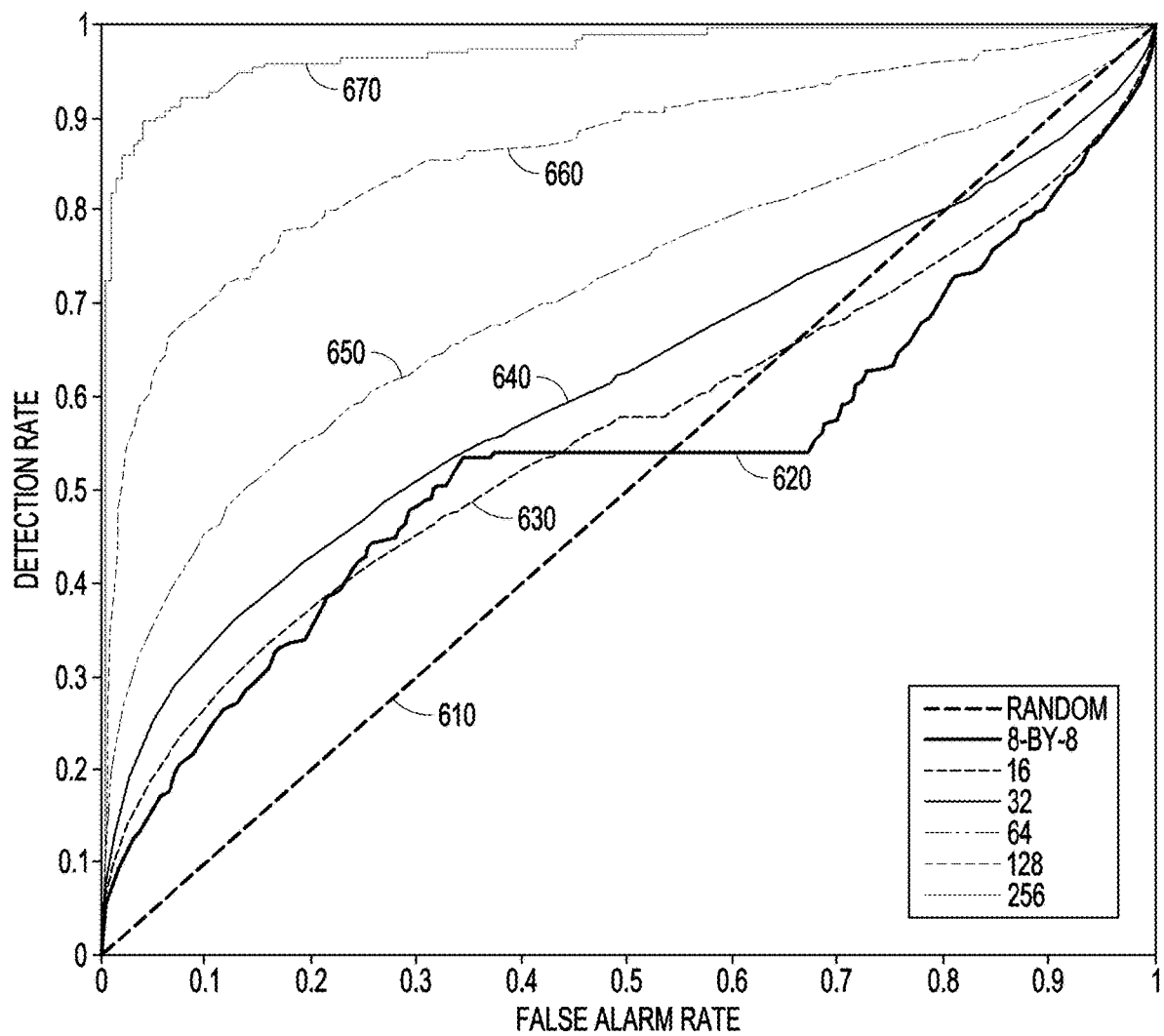
FIGS. 6A, 6B, and 6C are receiver operator characteristic curves (ROC) that illustrate that an approach of using a bilateral filter assists with the detection of non-standard pixels.
Figure 6B:
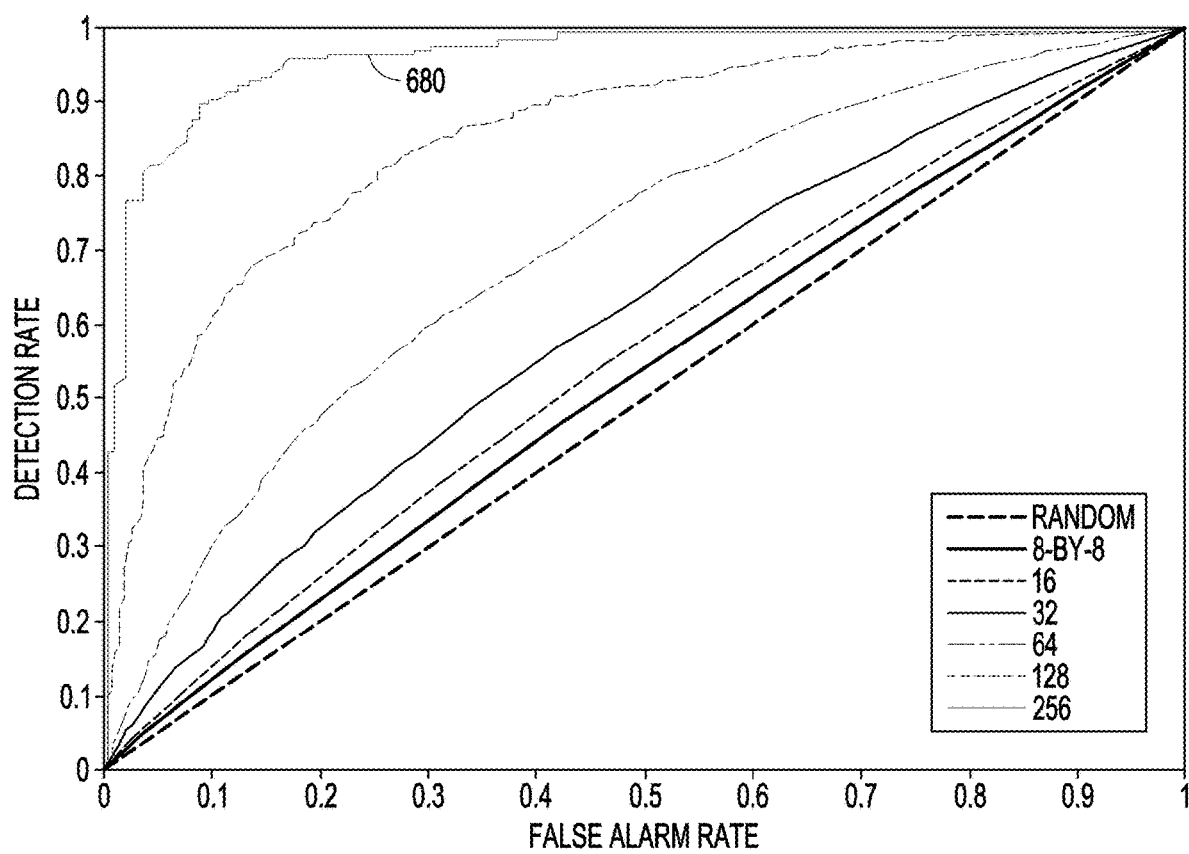
Figure 6C:
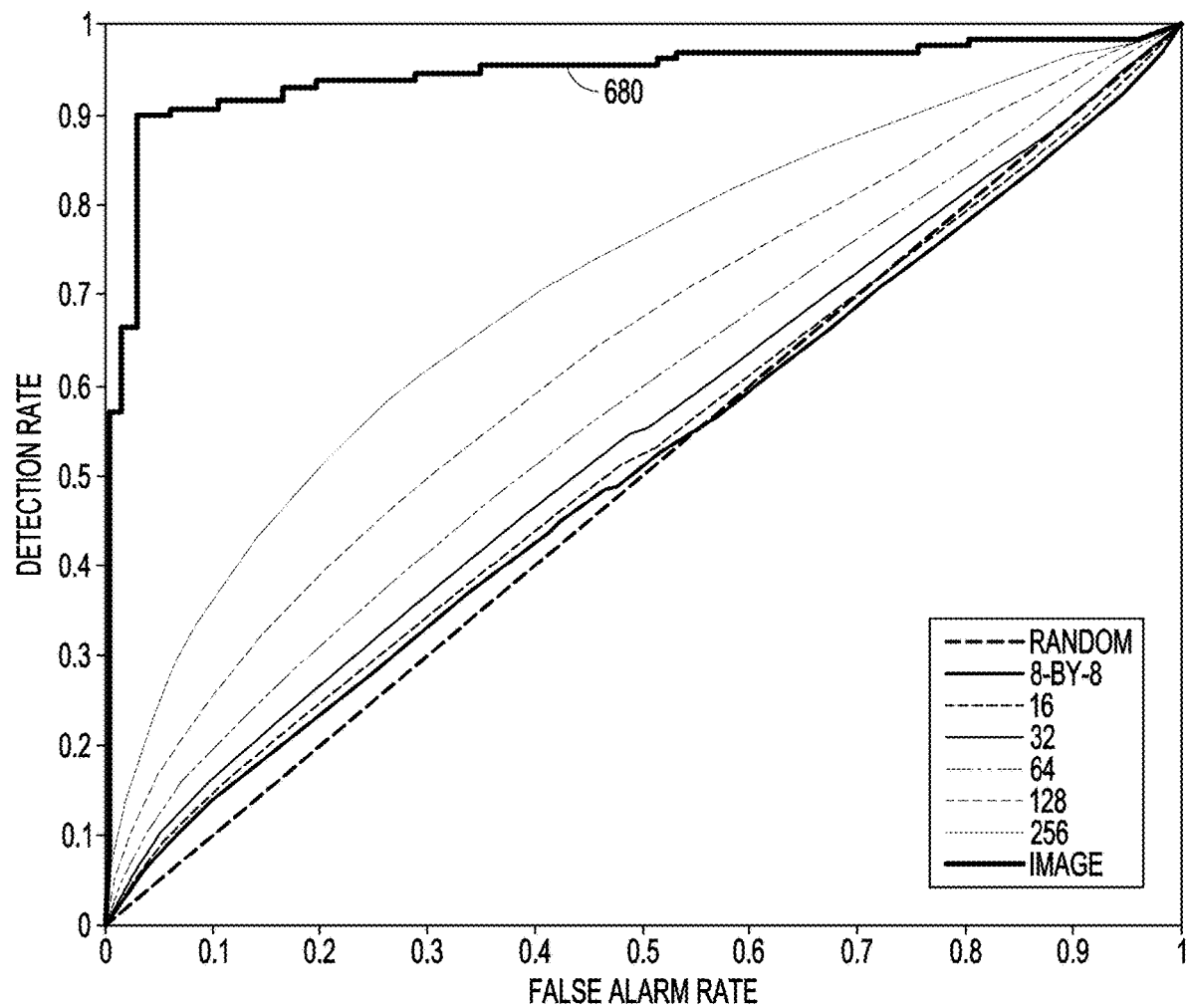
Figure 7A:
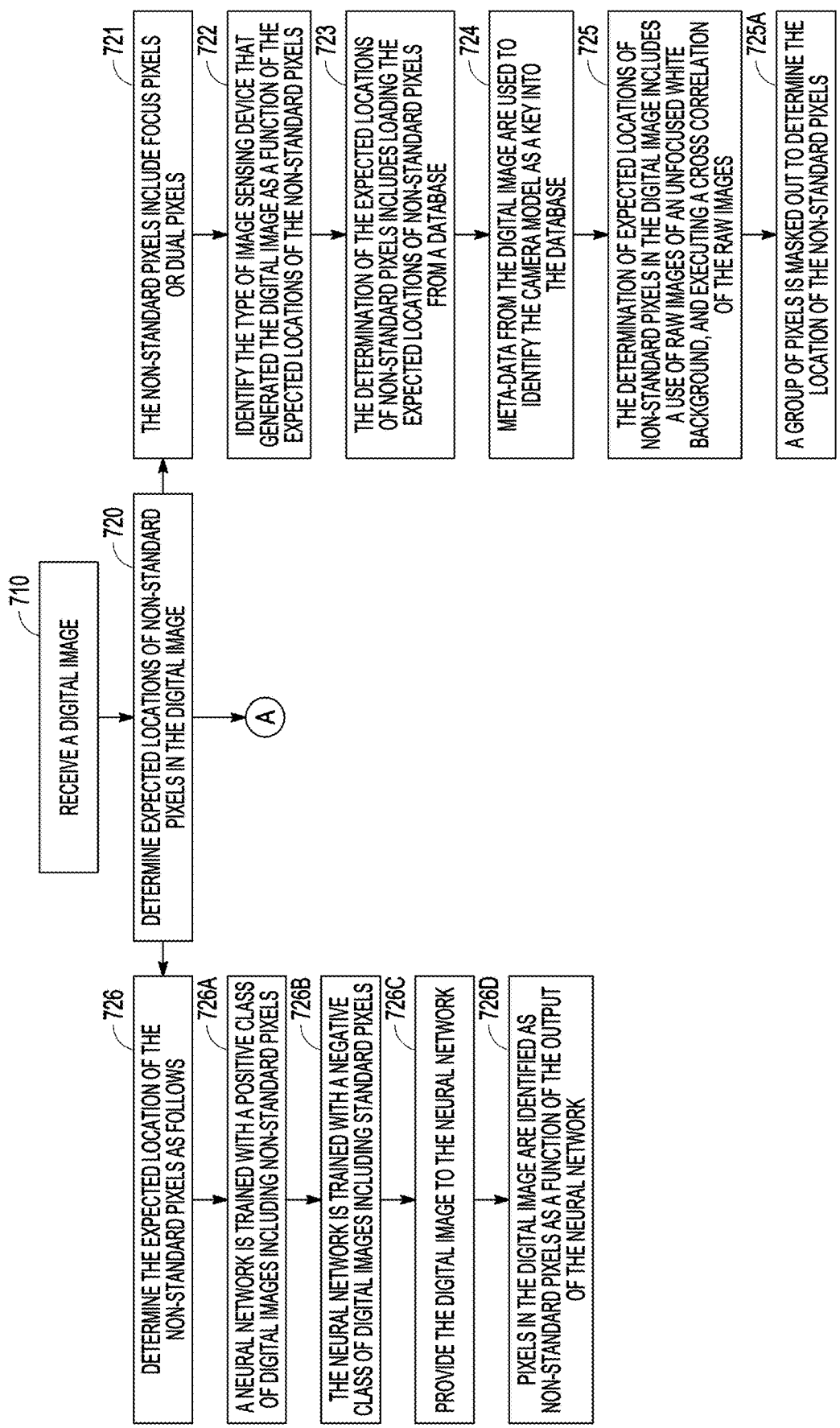
FIGS. 7A-7E illustrate a process of image forensics using non-standard pixels of a digital image.
Figure 7B:
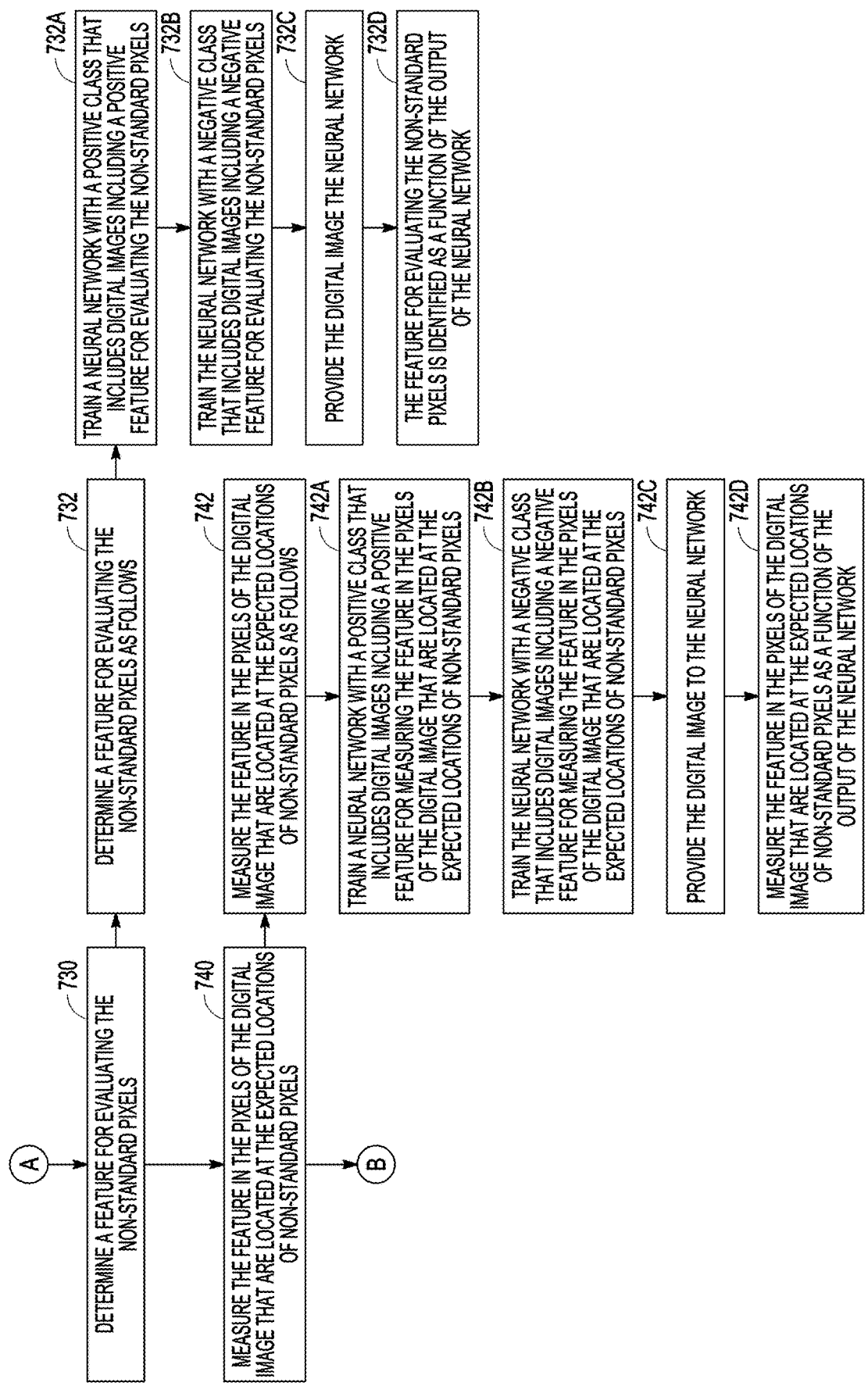
Figure 7C:
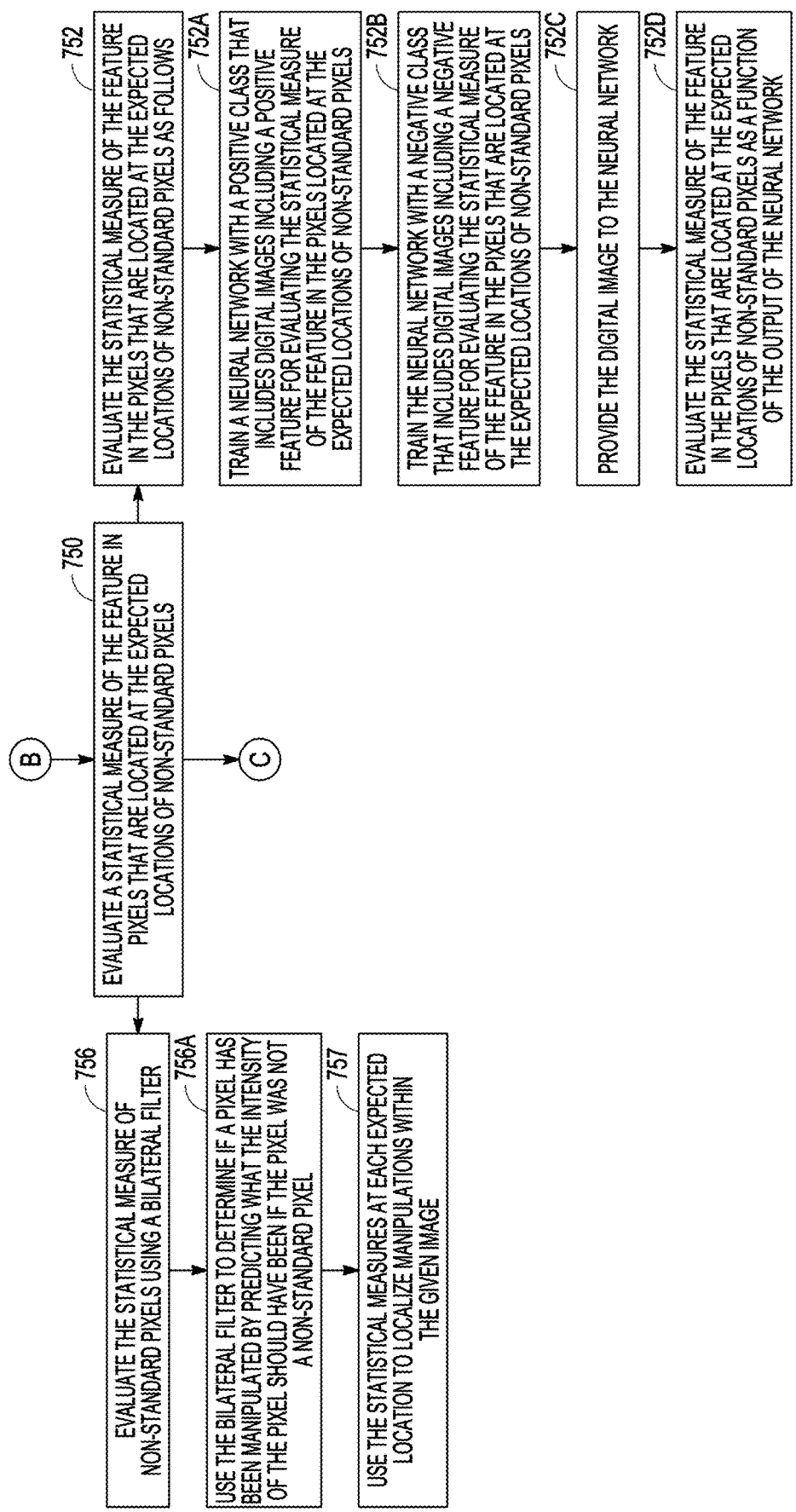
Figure 7D:
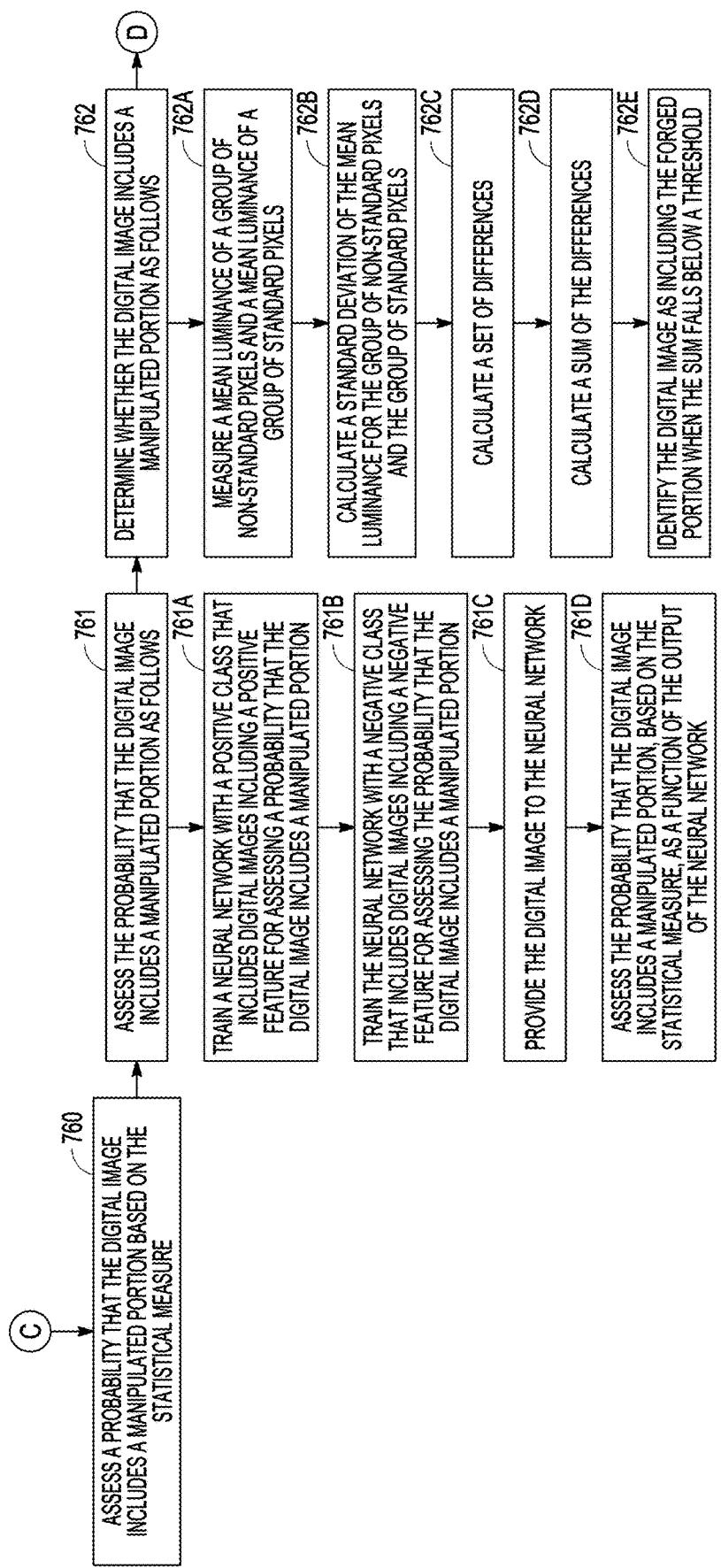
Figure 7E:
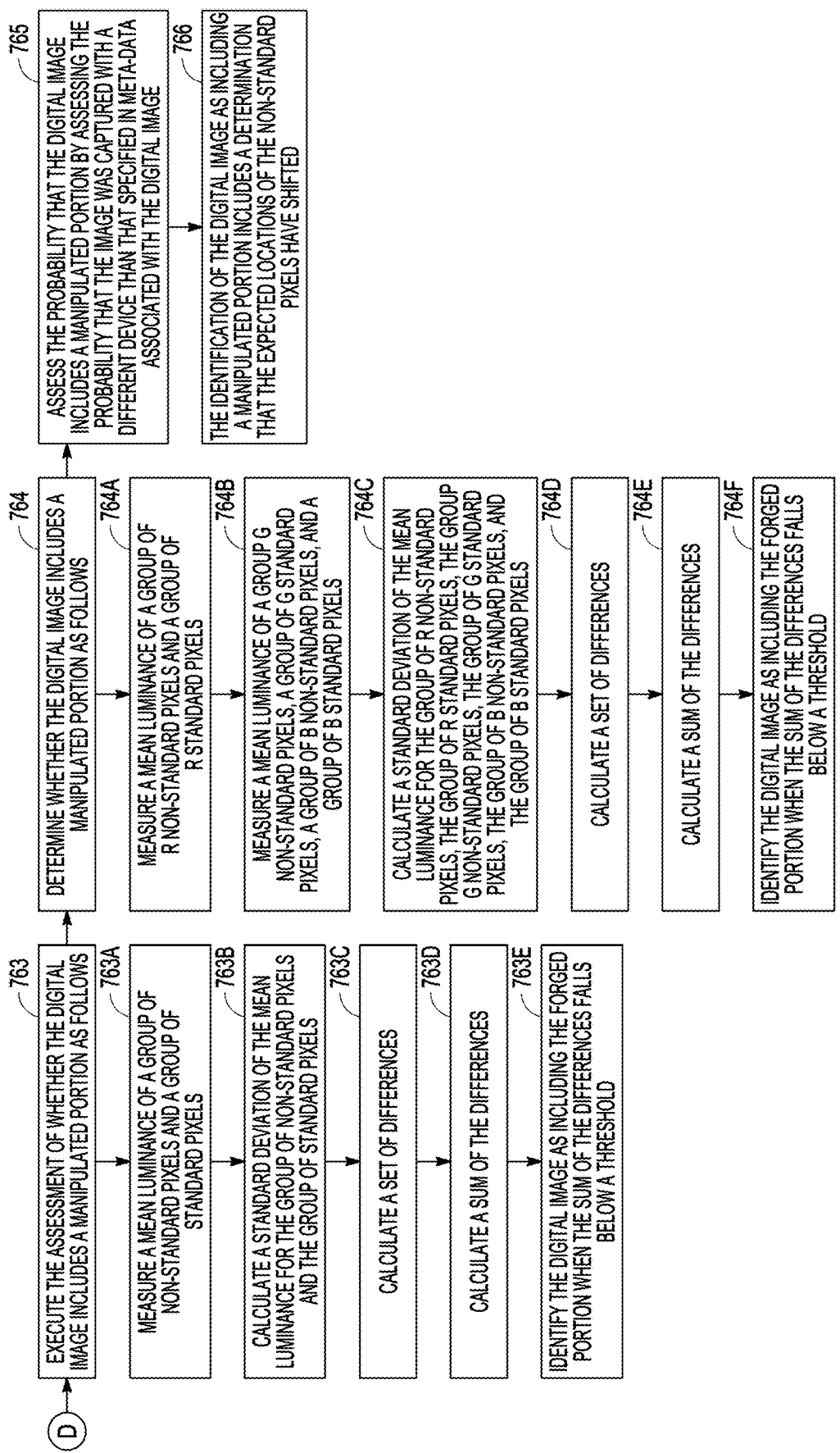

Referring to FIGS. 6A, 6B, and 6C, these figures of receiver operator characteristic curves (ROC) provide support that an approach of using a bilateral filter assists with the detection of non-standard pixels. In FIGS. 6A, 6B, and 6C, the horizontal axis is a false alarm rate. The goal is to distinguish patches of pixels that come from one type of device from the pixels of another type of device. If over the population of the patches of pixels from some other sensor, if half of the pixels were mistakenly identified as being from a different sensor, then one would be at 0.5 on the curve. If no mistakes were made at all, that is, if none of the other camera images were identified as being from the device of interest, then the false alarm rate would be zero on the horizontal axis. The vertical axis is the correct detection rate. If each block of pixels was correctly identified as being from the correct camera, this is indicated as the value of 1 on the vertical axis. Therefore, with an ROC curve, it is desirable to be up in the upper left hand corner, indicating a zero percent false alarm rate and a 100 percent correct detection rate.

If one is blindly guessing, this is indicated by the random diagonal dashed line 610 in FIG. 6A. With the simple case of images of white walls, the top curve 620 relates to when one is doing this assessment on 8×8 blocks of pixels, each of which have two non-standard pixels in them. This estimation is of a noisy quantity. If only an average is taken of two of these ratios, then that represents a least performing scenario of the top (red) curve 620. The curve is over a set of thresholds. If one goes from red 620 to green 630 to blue 640 to cyan 650 to magenta 660 to yellow 670, the blocks are getting bigger from 8×8 to 16×16 to 32×32 to 64×64, etc. As the blocks get bigger, the noisy signal is being averaged over many more non-standard pixels, and the output of that becomes more reliable. The ROC curves in FIGS. 6A, 6B, and 6C are of a white wall, wherein the image texture is not a significant problem.

The ROC curve in FIG. 6B shows that because the locations of the non-standard pixels are not rotationally symmetric, that is, if the image sensing device is rotated by 180 degrees, that is something that can be detected because the non-standard pixels are now no longer in their expected locations. The curves get better and better as one gets bigger and bigger blocks of pixels because again the noisy signal is being averaged over more observations.

The ROC curve in FIG. 6C illustrates what happens when such events actually occur. The ROC curve in FIG. 6B was rotated versus non-rotated, but still on white wall images. The ROC curve in FIG. 6C is what happens in the case of actual images of real things. The curves show that the performance gets quite a bit worse because the texture is a confounding factor. However, the situation improves with larger and larger blocks of pixels. FIG. 6C further shows a top black curve 680 which illustrates that if a single decision is made over the entire image, the entire 12 mega pixel image, which is quite a bit larger even than the 256×256 blocks of pixels of the other lines, that a result of 90 percent true detection rate can be attained on photographic images with less than a five percent false alarm rate. Again, this applies if there is an averaging over the entire image.

In another embodiment of assessing whether the non-standard pixels are where they should be, deep neural networks or other types of machine learning or artificial intelligence can be used. A deep neural network could be trained when presented with a patch of pixels from a specific camera, and the deep neural network would output a high confidence when presented with images captured by that camera. Likewise, if the deep neural network was provided with a patch of the same size pixels from some other camera, it would give a very low score. The neural network classifies whether the non-standard pixels are in their expected locations with their expected indicators.

In an embodiment, the basic building blocks are having a database, organized by camera model, of what sort of focusing hardware there is associated with each camera model, and a map of the non-standard pixels and the associated statistical indicators. Then, given an image, a database lookup will determine what the indicators are and where they should be. And then there is a computation of a quantity that indicates how consistent the image is with the information from the database on the camera make and model (via a bilateral filter, a neural network, or some other means). An assessment is then made as to whether the image at hand possesses those statistics.

As noted, some image sensing devices have a regular arrangement of non-standard pixels. With any given image, it can be assessed whether the non-standard pixels are intact. If the non-standard pixels are intact, it can be concluded that the image has not been tampered with. If there was some little region of the image wherein the non-standard pixels were not intact, it could be concluded that the image has been tampered with. If for instance there are non-standard pixels in a region, but they are slightly out of position, the specific manipulation can be determined such as the non-standard pixels were shifted two pixels to the right or some other similar manipulation. These are the sort of varying levels of detail that can be gotten from forensics based on non-standard pixels. These embodiments relate to a lot of the manipulations like splicing in or copy and paste. Embodiments can also address deep fakes, wherein images or videos are generated of well-known people, and the image depicts them saying something or doing something that they did not actually say or do.

Photo response non-uniformity (PRNU), as the name suggests, relates to the aspect that sensing devices have different pixels and that these different pixels have different responses to light. There is a similarity between PRNU and embodiments of this disclosure in the sense that at least in the PEG cases, the photo response of the pixel seems to be different. But there is a distinction between embodiments and PRNU. For non-standard pixels, this is a consequence of an intentional design decision where a device manufacturer has decided to, for example, mask half of the pixel in order to improve focusing. In contrast, PRNU is an unintentional difference of manufacturing imperfections, slight connectivity differences, wafer thicknesses, and all sorts of other manufacturing non-uniformities that lead to an undesired difference in the pixel intensities. PRNU is in some cases referred to as sensor fingerprinting. A fingerprint can be calculated for a particular device. With PRNU, because it involves these very slight manufacturing differences from one device to another, one can determine whether an image came from a particular physical device or whether it came from another particular device of the same make and model. That is, the two physical devices of the same make and model will have different sensor fingerprints because the have different water thicknesses or other differences. In the disclosed embodiments, the non-standard pixels do not attempt to distinguish between images taken with physically different instances of the same make and model. Rather, embodiments only try to determine whether an image was taken with any physical device of a particular make and model.

A problem with PRNU arises when a device attempts to account for shifts caused by an unsteady hand when capturing an image or video. The problem with that is in the first frame of the video there is just the regular first frame of the video. However, for the second frame of the video, it might have been detected that an unsteady hand shook a little bit in both horizontal and vertical directions. Consequently, instead of providing the frame of the video as it was read off the sensor, the frame is shifted by one pixel up and one pixel over. That is all well and good in terms of removing stabilization, but this sensor fingerprint is computed at each particular physical photo site. If this shifting happens, then it's no longer aligned with where the fingerprint should be. This has been an outstanding problem with these photo response non-uniformity forensic algorithms for some time. And what is really desired, and what an embodiment of non-standard pixel analysis can deliver, is that if there are frames of a video, the location of non-standard pixels can be found in each frame. The electronic image stabilization does something like shifting the whole image right and down by one pixel in each direction. An embodiment can compute from a frame of the video if the non-standard pixels moved, and if so, in which directions so that the motion of the frames from the stabilization can be backed out, which would allow photo response non-uniformity to be computed reliably on video. In summary, photo response non-uniformity has some technical similarities to the location and analysis of non-standard pixels. However, photo response non-uniformity can't be used on video because of image stabilization. Embodiments can estimate what the stabilization has done in order to make the sensor fingerprints to be able to compute the correct sensor fingerprint, even in the case of a stabilized video.

FIGS. 7A-7E and 8 are diagrams illustrating an image forensics process using non-standard pixels. FIGS. 7A-7E and 8 include process blocks 710-766 and 810-864 respectively. Though arranged substantially serially in the examples of FIGS. 7A-7E and 8, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring first to FIG. 7A-7E, at 710, a digital image is received into a computer processor, and then at 720, expected locations of non-standard pixels in the digital image are determined. As indicated at 721, the non-standard pixels include focus pixels or dual pixels that transmit a reduced portion of light or divide incoming light based on an incoming angle. At 722, the type of image sensing device that generated the digital image is identified as a function of the expected locations of the non-standard pixels and a feature of the non-standard pixels. As indicated at 723, the determination of the expected locations of non-standard pixels in the digital image includes loading the expected locations of non-standard pixels in the digital image from a database. In an embodiment, the database includes data relating to a camera model, an identity of focusing hardware associated with the camera model, the expected locations of non-standard pixels for the camera model, a feature associated with the non-standard pixels, and a statistical measure. At 724, meta-data from the digital image are used to identify the camera model as a key into the database. At 725, the determination of expected locations of non-standard pixels in the digital image includes a use of raw images of an unfocused white background, and executing a cross correlation of the raw images. The cross correlation provides a distance between non-standard pixels via peaks. At 725A, a group of pixels is masked out to determine the location of the non-standard pixels.

At 726, the expected location of the non-standard pixels is determined in the following manner. At 726A, a neural network is trained with a positive class that includes a first set of digital images including non-standard pixels, and at 726B, the neural network is trained with a negative class that includes a second set of digital images including standard pixels. After training the neural network, at 726C, the digital image is provided to the neural network, and at 726D, pixels in the digital image are identified as non-standard pixels as a function of the output of the neural network.

At 730, a feature for evaluating the non-standard pixels is determined. At 732, a feature for evaluating the non-standard pixels is determined in the following manner. At 732A, a neural network is trained with a positive class that includes a first set of digital images including a positive feature for evaluating the non-standard pixels. At 732B, the neural network is trained with a negative class that includes a second set of digital images including a negative feature for evaluating the non-standard pixels. After training the neural network, at 732C, the digital image is provided to the neural network, and at 732D, the feature for evaluating the non-standard pixels is identified as a function of the output of the neural network.

At 740, the feature is measured in the pixels of the digital image that are located at the expected locations of non-standard pixels. At 742, the feature in the pixels of the digital image that are located at the expected locations of non-standard pixels is measured in the following manner. At 742A, a neural network is trained with a positive class that includes a first set of digital images including a positive feature for measuring the feature in the pixels of the digital image that are located at the expected locations of non-standard pixels. At 742B, the neural network is trained with a negative class that includes a second set of digital images including a negative feature for measuring the feature in the pixels of the digital image that are located at the expected locations of non-standard pixels. After training the neural network, at 742C, the digital image is provided to the neural network, and at 742D, the feature in the pixels of the digital image that are located at the expected locations of non-standard pixels is measured as a function of the output of the neural network.

At 750, a statistical measure of the feature in pixels of the digital image that are located at the expected locations of non-standard pixels is evaluated. At 752, the statistical measure of the feature in the pixels of the digital image that are located at the expected locations of non-standard pixels is evaluated as follows. At 752A, a neural network is trained with a positive class that includes a first set of digital images including a positive feature for evaluating the statistical measure of the feature in pixels of the digital image that are located at the expected locations of non-standard pixels. At 752B, the neural network is trained with a negative class that includes a second set of digital images including a negative feature for evaluating the statistical measure of the feature in the pixels of the digital image that are located at the expected locations of non-standard pixels. After training the neural network, at 752C, the digital image is provided to the neural network, and at 752D, the statistical measure of the feature in the pixels of the digital image that are located at the expected locations of non-standard pixels is evaluated as a function of the output of the neural network.

At 756, the evaluation of the statistical measure of non-standard pixels in the digital image is evaluated using a bilateral filter. In an embodiment, the bilateral filter includes a function of pixel proximity and pixel intensity. Further, the assessed probability can be a function of the ratio of an actual intensity value of a pixel to an intensity value of the pixel as determined by the bilateral filter. At 756A, the bilateral filter is used to determine if a pixel has been manipulated by predicting what the intensity of the pixel should have been if the pixel was not a non-standard pixel. At 757, the statistical measures at each expected location are used to localize manipulations within the given image.

At 760, a probability that the digital image includes a manipulated portion is assessed based on the statistical measure. At 761, a probability that the digital image includes a manipulated portion, based on the statistical measure, is assessed as follows. At 761A, a neural network is trained with a positive class that includes a first set of digital images including a positive feature for assessing a probability that the digital image includes a manipulated portion (based on the statistical measure). At 761B, the neural network is trained with a negative class that includes a second set of digital images including a negative feature for assessing the probability that the digital image includes a manipulated portion (based on the statistical measure). After training the neural network, at 761C, the digital image is provided to the neural network, and 761D, the probability that the digital image includes a manipulated portion, based on the statistical measure, is assessed as a function of the output of the neural network.

At 762, the assessment of whether the digital image includes a manipulated portion is determined as follows. At 762A, a mean luminance of a group of non-standard pixels and a mean luminance of a group of standard pixels are measured. At 762B, a standard deviation of the mean luminance for the group of non-standard pixels is calculated, and a standard deviation of the mean luminance for the group of standard pixels is calculated. At 762C, a set of differences is calculated. In an embodiment, the set of differences includes a first difference between the mean luminance of the group of non-standard pixels and the mean luminance of the group of standard pixels, and a second difference between the standard deviation of the mean luminance for the group of non-standard pixels and the standard deviation of the mean luminance for the group of standard pixels. At 762D, a sum of the first difference and the second difference is calculated, and at 762E, the digital image is identified as including the forged portion when the sum of the first difference and the second difference falls below a threshold.

At 763, the assessment of whether the digital image includes a manipulated portion is executed as follows. At 763A, a mean luminance of a group of non-standard pixels is measured and a mean luminance of a group of standard pixels is measured. At 763B, a standard deviation of the mean luminance for the group of non-standard pixels is calculated, and a standard deviation of the mean luminance for the group of standard pixels is calculated. At 763C, a set of differences is calculated. In an embodiment, the set of differences includes a first difference between the mean luminance of the group of non-standard pixels and the mean luminance of the group of standard pixels, and a second difference between the standard deviation of the mean luminance for the group of non-standard pixels and the standard deviation of the mean luminance for the group of standard pixels. At 763D, a sum of the first difference and the second difference is calculated. At 763E, the digital image is identified as including the forged portion when the sum of the first difference and the second difference falls below a threshold.

At 764, the assessment of whether the digital image includes a manipulated portion is determined as follows. At 764A, a mean luminance of a group of R non-standard pixels is measured and a mean luminance of a group of R standard pixels is measured. At 764B, a mean luminance of a group G non-standard pixels, a mean luminance of a group of G standard pixels, a mean luminance of a group of B non-standard pixels, and a mean luminance of a group of B standard pixels are measured. At 764C, a standard deviation of the mean luminance for the group of R non-standard pixels, a standard deviation of the mean luminance for the group of R standard pixels, a standard deviation of the mean luminance for the group G non-standard pixels, a standard deviation of the mean luminance for the group of G standard pixels, a standard deviation of the mean luminance for the group of B non-standard pixels, and a standard deviation of the mean luminance for the group of B standard pixels are calculated. At 764D, a set of differences is calculated. In an embodiment, the set of differences includes a first difference between the mean luminance of the group of R non-standard pixels and the mean luminance of the group of R standard pixels, a second difference between the mean luminance of the group G non-standard pixels and the mean luminance of the group of G standard pixels, a third difference between the mean luminance of the group of B non-standard pixels and the mean luminance of a group of B standard pixels; a fourth difference between the standard deviation of the mean luminance for the group of R non-standard pixels and the standard deviation of the mean luminance for the group of R standard pixels, a fifth difference between the standard deviation of the mean luminance for the group G non-standard pixels and the standard deviation of the mean luminance for the group of G standard pixels, and a sixth difference between the standard deviation of the mean luminance for the group of B non-standard pixels and the standard deviation of the mean luminance for the group of B standard pixels. At 764E, a sum of the first difference, the second difference, the third difference, the fourth difference, the fifth difference, and the sixth difference are calculated. At 764F, the digital image is identified as including the forged portion when the sum of the first difference, the second difference, the third difference, the fourth difference, the fifth difference, and the sixth difference falls below a threshold.

At 765, the probability that the digital image includes a manipulated portion includes assessing the probability that the image was captured with a different device than that specified in meta-data associated with the digital image.

At 766, the identification of the digital image as including a manipulated portion includes a determination that the expected locations of the non-standard pixels have shifted.

Figure 8:
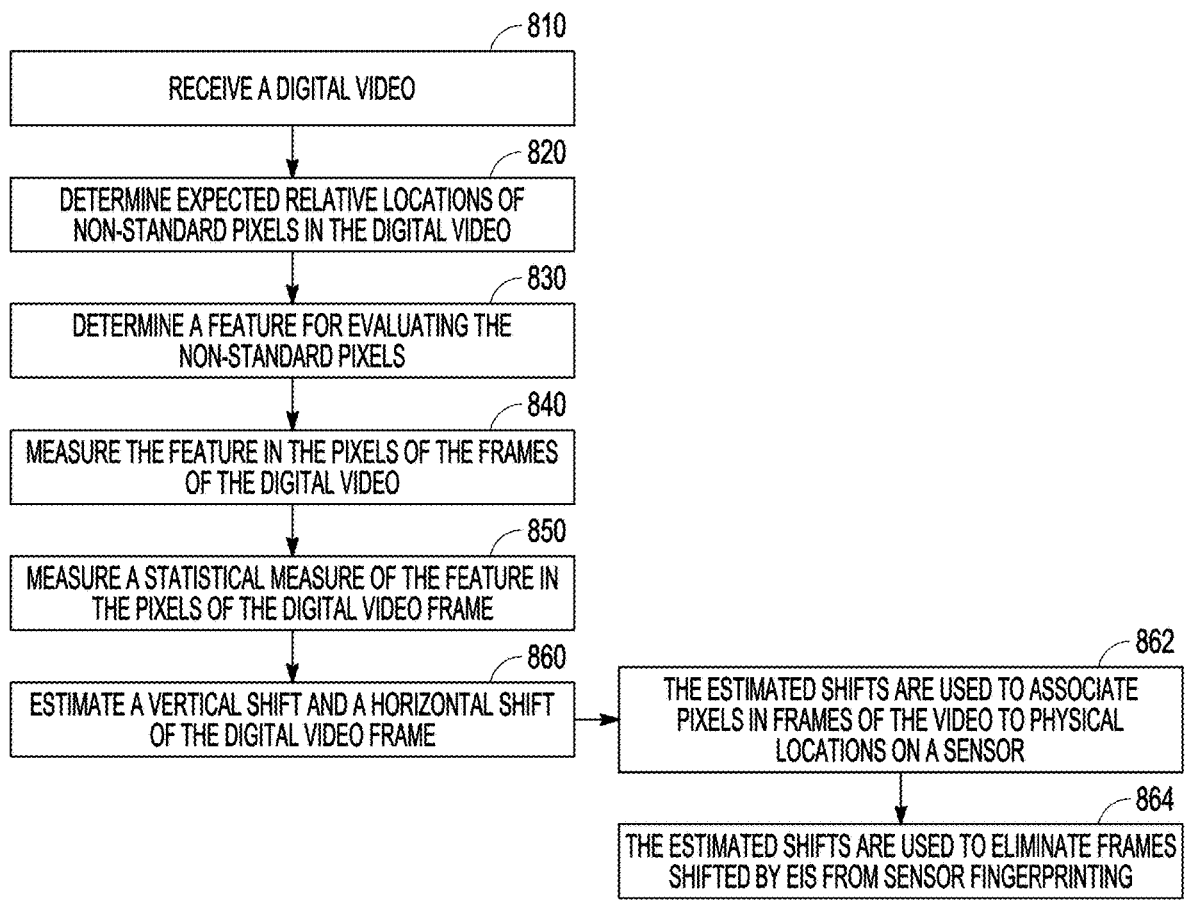
FIG. 8 illustrates another process of image forensics using non-standard pixels of a digital image.

Referring now to FIG. 8, at 810, a digital video is received into a computer processor. At 820, expected relative locations of non-standard pixels in the digital video are determined. At 830, a feature is determined for evaluating the non-standard pixels. At 840, the feature in the pixels of the frames of the digital video is measured. At 850, a statistical measure of the feature in the pixels of the digital video frame is measured. At 860, a vertical shift and a horizontal shift of the digital video frame is estimated relative to a second video digital frame.

At 862, the estimated shifts are used to associate pixels in frames of the video to physical locations on a sensor. This association between pixels and physical locations is used to compute a fingerprint of the sensor. At 864, the estimated shifts are used to eliminate frames shifted by Electronic Image Stabilization (EIS) from the process of sensor fingerprinting.

Figure 9:
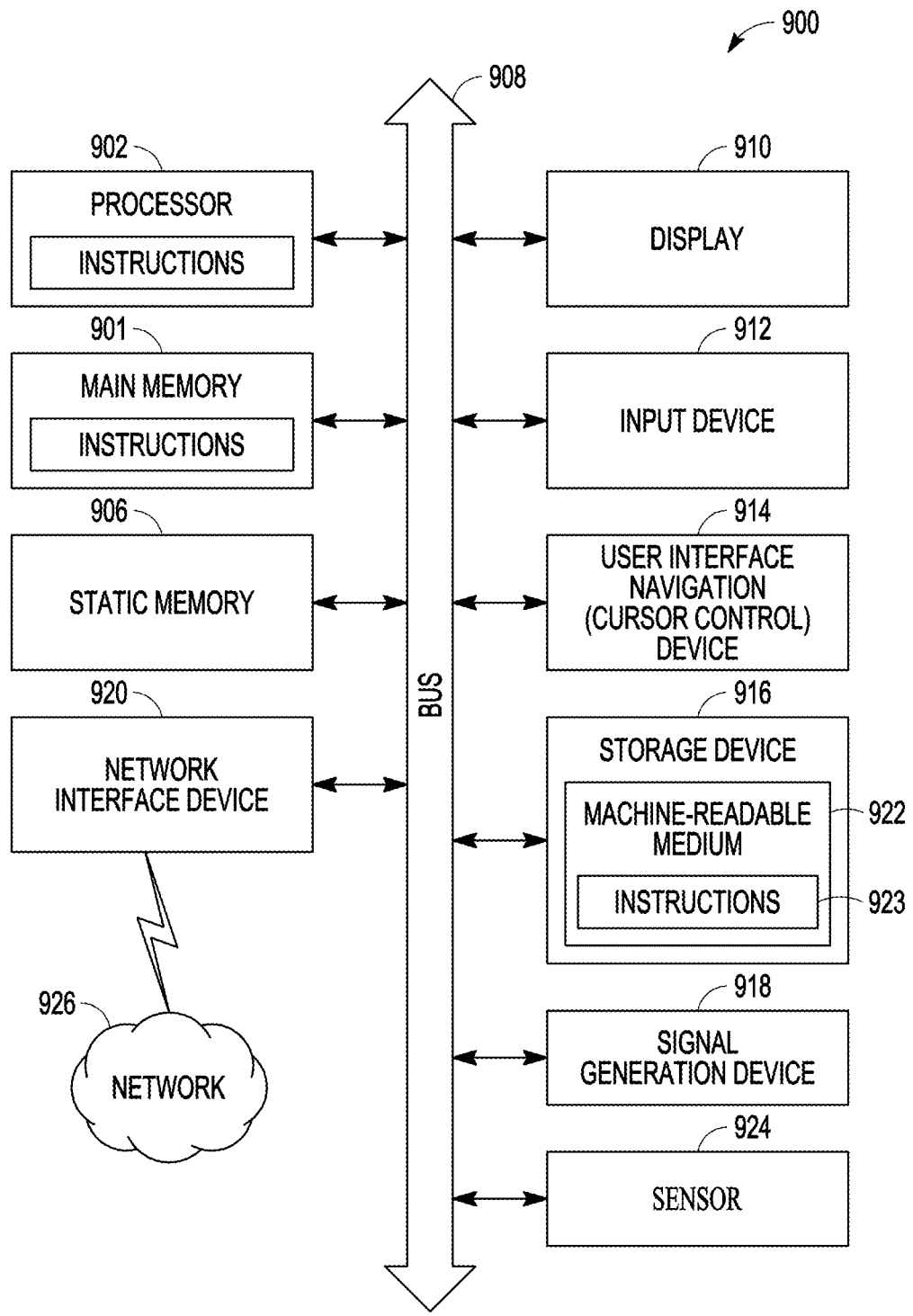
FIG. 9 is a block diagram of a computer system upon which one or more embodiments of the present disclosure can execute.

FIG. 9 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 901 and a static memory 906, which communicate with each other via a bus 908. The computer system 900 may further include a display unit 910, an alphanumeric input device 912 (e.g., a keyboard), and a user interface (UI) navigation device 914 (e.g., a mouse). In one embodiment, the display, input device and cursor control device are a touch screen display. The computer system 900 may additionally include a storage device 916 (e.g., drive unit), a signal generation device 918 (e.g., a speaker), a network interface device 920, and one or more sensors 924, such as a global positioning system sensor, compass, accelerometer, or other sensor.

The drive unit 916 includes a machine-readable medium 922 on which is stored one or more sets of instructions and data structures (e.g., software 923) embodying or utilized by any one or more of the methodologies or functions described herein. The software 923 may also reside, completely or at least partially, within the main memory 901 and/or within the processor 902 during execution thereof by the computer system 900, the main memory 901 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 923 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

EXAMPLE EMBODIMENTS

Example No. 1 is a process comprising receiving into a computer processor a digital image; determining expected locations of non-standard pixels in the digital image; determining a feature for evaluating the non-standard pixels; measuring the feature in pixels of the digital image that are located at the expected locations of non-standard pixels; evaluating a statistical measure of the feature in pixels of the digital image that are located at the expected locations of non-standard pixels; and assessing a probability that the digital image includes a manipulated portion, based on the statistical measure.

Example No. 2 includes all the features of Example No. 1, and optionally includes a process wherein the determining expected locations of non-standard pixels in the digital image comprises loading the expected locations of non-standard pixels in the digital image from a database, wherein the database comprises data relating to a camera model, an identity of focusing hardware associated with the camera model, the expected locations of non-standard pixels for the camera model, a feature associated with the non-standard pixels, and the statistical measure.

Example No. 3 includes all the features of Example Nos. 1-2, and optionally includes a process comprising using meta-data from the digital image to identify the camera model as a key into the database.

Example No. 4 includes all the features of Example Nos. 1-3, and optionally includes a process wherein assessing the probability the digital image includes a manipulated portion comprises assessing the probability that the image was captured with a different device than that specified in meta-data associated with the digital image.

Example No. 5 includes all the features of Example Nos. 1-4, and optionally includes a process comprising using a bilateral filter to evaluate the statistical measure of non-standard pixels in the digital image, wherein the bilateral filter comprises a function of pixel proximity and pixel intensity, and wherein the assessed probability is a function of the ratio of an actual intensity value of a pixel to an intensity value of the pixel as determined by the bilateral filter.

Example No. 6 includes all the features of Example Nos. 1-5, and optionally includes a process comprising using the bilateral filter to determine if a pixel has been manipulated by predicting what the intensity of the pixel should have been if the pixel was not a non-standard pixel.

Example No. 7 includes all the features of Example Nos. 1-6, and optionally includes a process comprising determining the expected location of the non-standard pixels by training a neural network with a positive class that includes a first set of digital images comprising non-standard pixels; training the neural network with a negative class that includes a second set of digital images comprising standard pixels; after training the neural network, providing the digital image to the neural network; and identifying pixels in the digital image as non-standard pixels as a function of the output of the neural network.

Example No. 8 includes all the features of Example Nos. 1-7, and optionally includes a process comprising determining a feature for evaluating the non-standard pixels by training a neural network with a positive class that includes a first set of digital images comprising a positive feature for evaluating the non-standard pixels; training the neural network with a negative class that includes a second set of digital images comprising a negative feature for evaluating the non-standard pixels; after training the neural network, providing the digital image to the neural network; and identifying the feature for evaluating the non-standard pixels as a function of the output of the neural network.

Example No. 9 includes all the features of Example Nos. 1-8, and optionally includes a process comprising measuring the feature in pixels of the digital image that are located at the expected locations of non-standard pixels by training a neural network with a positive class that includes a first set of digital images comprising a positive feature for measuring the feature in pixels of the digital image that are located at the expected locations of non-standard pixels; training the neural network with a negative class that includes a second set of digital images comprising a negative feature for measuring the feature in pixels of the digital image that are located at the expected locations of non-standard pixels; after training the neural network, providing the digital image to the neural network; and identifying the measuring the feature in pixels of the digital image that are located at the expected locations of non-standard pixels as a function of the output of the neural network.

Example No. 10 includes all the features of Example Nos. 1-9, and optionally includes a process comprising evaluating a statistical measure of the feature in pixels of the digital image that are located at the expected locations of non-standard pixels by training a neural network with a positive class that includes a first set of digital images comprising a positive feature for evaluating a statistical measure of the feature in pixels of the digital image that are located at the expected locations of non-standard pixels; training the neural network with a negative class that includes a second set of digital images comprising a negative feature for evaluating a statistical measure of the feature in pixels of the digital image that are located at the expected locations of non-standard pixels; after training the neural network, providing the digital image to the neural network; and identifying the evaluating a statistical measure of the feature in pixels of the digital image that are located at the expected locations of non-standard pixels as a function of the output of the neural network.

Example No. 11 includes all the features of Example Nos. 1-10, and optionally includes a process comprising assessing a probability that the digital image includes a manipulated portion, based on the statistical measure by training a neural network with a positive class that includes a first set of digital images comprising a positive feature for assessing a probability that the digital image includes a manipulated portion, based on the statistical measure; training the neural network with a negative class that includes a second set of digital images comprising a negative feature for assessing a probability that the digital image includes a manipulated portion, based on the statistical measure; after training the neural network, providing the digital image to the neural network; and identifying the assessing a probability that the digital image includes a manipulated portion, based on the statistical measure as a function of the output of the neural network.

Example No. 12 includes all the features of Example Nos. 1-11, and optionally includes a process wherein the non-standard pixels comprise focus pixels or dual pixels that transmit a reduced portion of light or divide incoming light based on an incoming angle.

Example No. 13 includes all the features of Example Nos. 1-12, and optionally includes a process wherein the digital image comprises a PEG format.

Example No. 14 includes all the features of Example Nos. 1-13, and optionally includes a process wherein the feature comprises a luminance.

Example No. 15 includes all the features of Example Nos. 1-14, and optionally includes a process wherein the assessing whether the digital image includes a manipulated portion comprises measuring a mean luminance of a group of non-standard pixels; measuring a mean luminance of a group of standard pixels; calculating a standard deviation of the mean luminance for the group of non-standard pixels; calculating a standard deviation of the mean luminance for the group of standard pixels; calculating a set of differences, the set of differences comprising a first difference between the mean luminance of the group of non-standard pixels and the mean luminance of the group of standard pixels, and a second difference between the standard deviation of the mean luminance for the group of non-standard pixels and the standard deviation of the mean luminance for the group of standard pixels; calculating a sum of the first difference and the second difference; and identifying the digital image as including the forged portion when the sum of the first difference and the second difference falls below a threshold.

Example No. 16 includes all the features of Example Nos. 1-15, and optionally includes a process wherein the assessing whether the digital image includes a manipulated portion comprises measuring a mean luminance of a group of R non-standard pixels; measuring a mean luminance of a group of R standard pixels; measuring a mean luminance of a group G non-standard pixels; measuring a mean luminance of a group of G standard pixels; measuring a mean luminance of a group of B non-standard pixels; measuring a mean luminance of a group of B standard pixels; calculating a standard deviation of the mean luminance for the group of R non-standard pixels; calculating a standard deviation of the mean luminance for the group of R standard pixels; calculating a standard deviation of the mean luminance for the group G non-standard pixels; calculating a standard deviation of the mean luminance for the group of G standard pixels; calculating a standard deviation of the mean luminance for the group of B non-standard pixels; calculating a standard deviation of the mean luminance for the group of B standard pixels; calculating a set of differences, the set of differences comprising a first difference between the mean luminance of the group of R non-standard pixels and the mean luminance of the group of R standard pixels, a second difference between the mean luminance of the group G non-standard pixels and the mean luminance of the group of G standard pixels, a third difference between the mean luminance of the group of B non-standard pixels and the mean luminance of a group of B standard pixels; a fourth difference between the standard deviation of the mean luminance for the group of R non-standard pixels and the standard deviation of the mean luminance for the group of R standard pixels, a fifth difference between the standard deviation of the mean luminance for the group G non-standard pixels and the standard deviation of the mean luminance for the group of G standard pixels, and a sixth difference between the standard deviation of the mean luminance for the group of B non-standard pixels and the standard deviation of the mean luminance for the group of B standard pixels; calculating a sum of the first difference, the second difference, the third difference, the fourth difference, the fifth difference, and the sixth difference; and identifying the digital image as including the forged portion when the sum of the first difference, the second difference, the third difference, the fourth difference, the fifth difference, and the sixth difference falls below a threshold.

Example No. 17 includes all the features of Example Nos. 1-16, and optionally includes a process wherein the digital image comprises a non-textured image.

Example No. 18 includes all the features of Example Nos. 1-17, and optionally includes a process comprising identifying a type of image sensing device that generated the digital image as a function of the expected locations of the non-standard pixels and the feature of the non-standard pixels.

Example No. 19 includes all the features of Example Nos. 1-18, and optionally includes a process wherein the determining of expected locations of non-standard pixels in the digital image comprises a use of raw images of an unfocused white background.

Example No. 20 includes all the features of Example Nos. 1-19, and optionally includes a process comprising executing a cross correlation of the raw images, wherein the cross correlation provides a distance between non-standard pixels via peaks, and masking out a group of pixels to determine the location of the non-standard pixels.

Example No. 21 includes all the features of Example Nos. 1-20, and optionally includes a process wherein the identifying the digital image as including a manipulated portion comprises a determination that the expected locations of the non-standard pixels have shifted.

Example No. 22 includes all the features of Example Nos. 1-21, and optionally includes a process wherein the statistical indicators at each expected location are used to localize manipulations within the given image.

Example No. 23 is a process comprising receiving into a computer processor a digital video; determining expected relative locations of non-standard pixels in the digital video; determining a feature for evaluating the non-standard pixels; measuring the feature in pixels of frames of the digital video; evaluating a statistical measure of the feature in pixels of the digital video frame; and estimating a vertical shift and a horizontal shift of the digital video frame relative to a second video digital frame.

Example No. 24 includes all the features of Example No. 23, and optionally includes a process wherein the estimated shifts are used to associate pixels in frames of the video to physical locations on a sensor.

Example No. 25 includes all the features of Example Nos. 23-24, and optionally includes a process wherein the association between pixels and physical locations is used to compute a fingerprint of the sensor.

Example No. 26 includes all the features of Example Nos. 23-25, and optionally includes a process wherein estimated shifts are used to eliminate frames shifted by Electronic Image Stabilization from the process of sensor fingerprinting.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
receiving into a computer processor a digital image;
determining expected locations of non-standard pixels in the digital image;
determining a feature for evaluating the non-standard pixels;
measuring the feature in pixels of the digital image that are located at the expected locations of non-standard pixels;
evaluating a statistical measure of the feature in pixels of the digital image that are located at the expected locations of non-standard pixels; and
assessing a probability that the digital image includes a manipulated portion, based on the statistical measure;
wherein the non-standard pixels comprise a focus pixel or a dual pixel.

2. The process of claim 1, wherein the determining expected locations of non-standard pixels in the digital image comprises loading the expected locations of non-standard pixels in the digital image from a database, wherein the database comprises data relating to a camera model, an identity of focusing hardware associated with the camera model, the expected locations of non-standard pixels for the camera model, a feature associated with the non-standard pixels, and the statistical measure.

3. The process of claim 2, comprising using meta-data from the digital image to identify the camera model as a key into the database.

4. The process of claim 2, wherein assessing the probability the digital image includes a manipulated portion comprises assessing the probability that the image was captured with a different device than that specified in meta-data associated with the digital image.

5. The process of claim 1, comprising using a bilateral filter to evaluate the statistical measure of non-standard pixels in the digital image, wherein the bilateral filter comprises a function of pixel proximity and pixel intensity, and wherein the assessed probability is a function of the ratio of an actual intensity value of a pixel to an intensity value of the pixel as determined by the bilateral filter; and comprising using the bilateral filter to determine if a pixel has been manipulated by predicting what the intensity of the pixel should have been if the pixel was not a non-standard pixel.

6. The method of claim 1, comprising determining the expected location of the non-standard pixels by:
   training a neural network with a positive class that includes a first set of digital images comprising non-standard pixels;
   training the neural network with a negative class that includes a second set of digital images comprising standard pixels;
   after training the neural network, providing the digital image to the neural network; and
   identifying pixels in the digital image as non-standard pixels as a function of the output of the neural network.

7. The method of claim 1, comprising determining a feature for evaluating the non-standard pixels by:
   training a neural network with a positive class that includes a first of digital images comprising a positive feature for evaluating the non-standard pixels;
   training the neural network with a negative class that includes a second set of digital images comprising a negative feature for evaluating the non-standard pixels;
   after training the neural network, providing the digital image to the neural network; and
   identifying the feature for evaluating the non-standard pixels as a function of the output of the neural network.

8. The method of claim 1, comprising measuring the feature in pixels of the digital image that are located at the expected locations of non-standard pixels by:
   training a neural network with a positive class that includes a first set of digital images comprising a positive feature for measuring the feature in pixels of the digital image that are located at the expected locations of non-standard pixels;
   training the neural network with a negative class that includes a second set of digital images comprising a negative feature for measuring the feature in pixels of the digital image that are located at the expected locations of non-standard pixels;
   after training the neural network, providing the digital image to the neural network; and
   identifying the measuring the feature in pixels of the digital image that are located at the expected locations of non-standard pixels as a function of the output of the neural network.

9. The method of claim 1, comprising evaluating a statistical measure of the feature in pixels of the digital image that are located at the expected locations of non-standard pixels by:
   training a neural network with a positive class that includes a first set of digital images comprising a positive feature for evaluating a statistical measure of the feature in pixels of the digital image that are located at the expected locations of non-standard pixels;
   training the neural network with a negative class that includes a second set of digital images comprising a negative feature for evaluating a statistical measure of the feature in pixels of the digital image that are located at the expected locations of non-standard pixels;
   after training the neural network, providing the digital image to the neural network; and
   identifying the evaluating a statistical measure of the feature in pixels of the digital image that are located at the expected locations of non-standard pixels as a function of the output of the neural network.

10. The method of claim 1, comprising assessing a probability that the digital image includes a manipulated portion, based on the statistical measure by:
    training a neural network with a positive class that includes a first set of digital images comprising a positive feature for assessing a probability that the digital image includes a manipulated portion, based on the statistical measure;
    training the neural network with a negative class that includes a second set of digital images comprising a negative feature for assessing a probability that the digital image includes a manipulated portion, based on the statistical measure;
    after training the neural network, providing the digital image to the neural network; and
    identifying the assessing a probability that the digital image includes a manipulated portion, based on the statistical measure as a function of the output of the neural network.

11. The process of claim 1, wherein the non-standard pixels comprise focus pixels or dual pixels that transmit a reduced portion of light or divide incoming light based on an incoming angle.

12. The process of claim 1, wherein the assessing whether the digital image includes a manipulated portion comprises:
    measuring a mean luminance of a group of non-standard pixels;
    measuring a mean luminance of a group of standard pixels;
    calculating a standard deviation of the mean luminance for the group of non-standard pixels;
    calculating a standard deviation of the mean luminance for the group of standard pixels;
    calculating a set of differences, the set of differences comprising a first difference between the mean luminance of the group of non-standard pixels and the mean luminance of the group of standard pixels, and a second difference between the standard deviation of the mean luminance for the group of non-standard pixels and the standard deviation of the mean luminance for the group of standard pixels;
    calculating a sum of the first difference and the second difference; and
    identifying the digital image as including the forged portion when the sum of the first difference and the second difference falls below a threshold.

13. The process of claim 1, wherein the assessing whether the digital image includes a manipulated portion comprises:
    measuring a mean luminance of a group of R non-standard pixels;
    measuring a mean luminance of a group of R standard pixels;
    measuring a mean luminance of a group G non-standard pixels;
    measuring a mean luminance of a group of G standard pixels;
    measuring a mean luminance of a group of B non-standard pixels;
    measuring a mean luminance of a group of B standard pixels;
    calculating a standard deviation of the mean luminance for the group of R non-standard pixels;
    calculating a standard deviation of the mean luminance for the group of R standard pixels;
    calculating a standard deviation of the mean luminance for the group G non-standard pixels;

calculating a standard deviation of the mean luminance for the group of G standard pixels;
calculating a standard deviation of the mean luminance for the group of B non-standard pixels;
calculating a standard deviation of the mean luminance for the group of B standard pixels;
calculating a set of differences, the set of differences comprising a first difference between the mean luminance of the group of R non-standard pixels and the mean luminance of the group of R standard pixels, a second difference between the mean luminance of the group G non-standard pixels and the mean luminance of the group of G standard pixels, a third difference between the mean luminance of the group of B non-standard pixels and the mean luminance of a group of B standard pixels; a fourth difference between the standard deviation of the mean luminance for the group of R non-standard pixels and the standard deviation of the mean luminance for the group of R standard pixels, a fifth difference between the standard deviation of the mean luminance for the group G non-standard pixels and the standard deviation of the mean luminance for the group of G standard pixels, and a sixth difference between the standard deviation of the mean luminance for the group of B non-standard pixels and the standard deviation of the mean luminance for the group of B standard pixels;
calculating a sum of the first difference, the second difference, the third difference the fourth difference, the fifth difference, and the sixth difference; and
identifying the digital image as including the forged portion when the sum of the first difference, the second difference, the third difference, the fourth difference, the fifth difference, and the sixth difference falls below a threshold.

14. The process of claim 1, comprising identifying a type of image sensing device that generated the digital image as a function of the expected locations of the non-standard pixels and the feature of the non-standard pixels.

15. The process of claim 1, wherein the determining of expected locations of non-standard pixels in the digital image comprises a use of raw images of an unfocused white background; and comprising executing a cross correlation of the raw images, wherein the cross correlation provides a distance between non-standard pixels via peaks, and masking out a group of pixels to determine the location of the non-standard pixels.

16. The process of claim 1, wherein the identifying the digital image as including a manipulated portion comprises a determination that the expected locations of the non-standard pixels have shifted.

17. The process of claim 1, wherein the statistical measures at each expected location are used to localize manipulations within the given image.

18. A process comprising:
receiving into a computer processor a digital video;
determining expected relative locations of non-standard pixels in the digital video;
determining a feature for evaluating the non-standard pixels;
measuring the feature in pixels of frames of the digital video;
evaluating a statistical measure of the feature in pixels of the digital video frame; and
estimating a vertical shift and a horizontal shift of the digital video frame relative to a second video digital frame;
wherein the non-standard pixels comprise a focus pixel or a dual pixel.

19. The process of claim 18, wherein the estimated shifts are used to associate pixels in frames of the video to physical locations on a sensor and wherein the association between pixels and physical locations is used to compute a fingerprint of the sensor.

20. The process of claim 18, wherein estimated shifts are used to eliminate frames shifted by Electronic Image Stabilization from the process of sensor fingerprinting.

* * * * *